US012795618B2

(12) United States Patent
Yi et al.

(10) Patent No.: US 12,795,618 B2
(45) Date of Patent: Nov. 10, 2026

(54) METHOD AND DEVICE FOR UPLINK CHANNEL TRANSMISSION IN WIRELESS COMMUNICATION SYSTEM

(71) Applicant: Samsung Electronics Co., Ltd., Suwon-si (KR)

(72) Inventors: Junyung Yi, Suwon-si (KR); Youngbum Kim, Suwon-si (KR); Hyunseok Ryu, Suwon-si (KR); Sungjin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 18/294,565

(22) PCT Filed: Aug. 3, 2022

(86) PCT No.: PCT/KR2022/011470

§ 371 (c)(1),
(2) Date: Feb. 2, 2024

(87) PCT Pub. No.: WO2023/014078

PCT Pub. Date: Feb. 9, 2023

(65) Prior Publication Data

US 2024/0340864 A1 Oct. 10, 2024

(30) Foreign Application Priority Data

Aug. 3, 2021 (KR) ........................ 10-2021-0102049
Sep. 29, 2021 (KR) ........................ 10-2021-0128799

(51) Int. Cl.
*H04W 72/0446* (2023.01)
*H04W 8/22* (2009.01)
(Continued)

(52) U.S. Cl.
CPC ......... *H04W 72/0446* (2013.01); *H04W 8/22* (2013.01); *H04W 28/16* (2013.01); *H04W 72/1268* (2013.01)

(58) Field of Classification Search
CPC .......... H04L 1/08; H04W 8/22; H04W 28/16; H04W 52/0235; H04W 52/0248;
(Continued)

(56) References Cited

U.S. PATENT DOCUMENTS 11,792,048 B2 * 10/2023 Park .................... H04L 25/0202 370/252
11,811,600 B2 11/2023 Ramasamy et al.
(Continued)

FOREIGN PATENT DOCUMENTS

KR 10-2021-0063025 A 6/2021
WO 2021060301 A1 4/2021
(Continued)

OTHER PUBLICATIONS

Huawei et al., Discussion on joint channel estimation for PUSCH, May 10, 2021, 3GPP TSG RAN WG1 #105-e, Agenda Item: 8.8.1.2, Tdoc: R1-2104241 (Year: 2021).*
(Continued)

*Primary Examiner* — Eric Nowlin

(57) ABSTRACT

The present disclosure relates to a 5G or 6G communication system for supporting a higher data transmission rate. A method performed by a terminal of a wireless communication system according to an embodiment of the present disclosure comprises the steps of: receiving, from a base station, a message including first information about the length of a time domain window (TDW) and second information indicating whether to activate repeated physical uplink shared channel (PUSCH) transmissions, the number of which is counted on the basis of available slots for
(Continued)

PUSCH transmission; determining at least one TDW on the basis of the first information and the second information; and transmitting a PUSCH to the base station while maintaining power consistency and phase continuity, on the basis of the determined at least one TDW.

8 Claims, 20 Drawing Sheets

(51) Int. Cl.
*H04W 28/16* (2009.01)
*H04W 72/1268* (2023.01)

(58) Field of Classification Search
CPC ............... H04W 52/04; H04W 52/146; H04W 72/0446; H04W 72/1268
See application file for complete search history.

(56) References Cited

U.S. PATENT DOCUMENTS

| | | | | |
|---|---|---|---|---|
| 12,016,014 | B2 * | 6/2024 | Maso | H04L 5/0051 |
| 12,556,432 | B2 * | 2/2026 | Sridharan | H04L 5/0051 |
| 2020/0162208 | A1 | 5/2020 | Moon et al. | |
| 2020/0187237 | A1 | 6/2020 | Su et al. | |
| 2020/0366425 | A1 | 11/2020 | Takeda | |
| 2020/0367208 | A1 | 11/2020 | Khoshnevisan et al. | |
| 2022/0029859 | A1 * | 1/2022 | Park | H04W 72/23 |
| 2022/0247601 | A1 * | 8/2022 | Sridharan | H04L 5/0051 |
| 2023/0033400 | A1 * | 2/2023 | Maso | H04L 5/0051 |
| 2024/0187281 | A1 * | 6/2024 | Qiao | H04L 25/0204 |
| 2024/0205918 | A1 * | 6/2024 | Maso | H04L 5/0051 |
| 2024/0250794 | A1 * | 7/2024 | Liu | H04L 5/0051 |
| 2024/0276487 | A1 * | 8/2024 | Feng | H04L 5/0069 |
| 2024/0291689 | A1 * | 8/2024 | Liu | H04L 25/0202 |
| 2025/0048272 | A1 * | 2/2025 | Xiong | H04W 52/325 |

FOREIGN PATENT DOCUMENTS

| | | | | |
|---|---|---|---|---|
| WO | WO-2024035198 A1 * | 2/2024 | | H04L 1/0027 |
| WO | WO-2025032842 A1 * | 2/2025 | | H04W 8/24 |

OTHER PUBLICATIONS

Spreadtrum Communications, Discussion on joint channel estimation for PUSCH, May 10, 2021, 3GPP TSG RAN WG1 #105-e, Agenda Item: 8.8.1.2, Tdoc: R1-2104437 (Year: 2021).*
CATT, Discussion on joint channel estimation for PUSCH, May 19, 2021, 3GPP TSG RAN WG1 #105-e, Agenda Item: 8.8.1.2, Tdoc: R1-2104539 (Year: 2021).*
CMCC, Discussion on joint channel estimation for PUSCH, May 10, 2021, 3GPP TSG RAN WG1 #105-e, Agenda Item: 8.8.1.2, Tdoc: R1-2104627 (Year: 2021).*
Qualcomm Incorporated, Joint channel estimation for PUSCH, May 10, 2021, 3GPP TSG RAN WG1 #105-e, Agenda Item: 8.8.1.3 Tdoc: R1-2104687 (Year: 2021).*
Oppo, Consideration on Joint channel estimation for PUSCH, May 10, 2021, 3GPP TSG RAN WG1 #105-e, Agenda Item: 8.8.1.3, Tdoc: R1-2104794 (Year: 2021).*
China Telecom, Discussion on joint channel estimation for PUSCH, May 10, 2021, 3GPP TSG RAN WG1 #105-e, Agenda Item: 8.8.1.3, Tdoc: R1-2104848 (Year: 2021).*
InterDigital, Inc., Joint channel estimation for PUSCH, May 10, 2021, 3GPP TSG RAN WG1 #105-e, Agenda Item: 8.8.1.3, Tdoc: R1-2104861 (Year: 2021).*
Intel Corporation, Discussion on joint channel estimation for PUSCH, May 10, 2021, 3GPP TSG RAN WG1 #105-e, Agenda Item: 8.8.1.3, Tdoc: R1-2104921 (Year: 2021).*
Apple Inc., Discussion on joint channel estimation for PUSCH, May 10, 2021, 3GPP TSG RAN WG1 #105-e, Agenda Item: 8.8.1.3, Tdoc: R1-2105121 (Year: 2021).*
Sony, Joint channel estimation for PUSCH, May 10, 2021, 3GPP TSG RAN WG1 #105-e, Agenda Item: 8.8.1.3, Tdoc: R1-2105176 (Year: 2021).*
MediaTek Inc., Discussion on joint channel estimation for PUSCH, May 10, 2021, 3GPP TSG RAN WG1 #105-e, Agenda Item: 8.8.1.3, Tdoc: R1-2105394 (Year: 2021).*
Panasonic, Discussion on joint channel estimation for PUSCH, May 10, 2021, 3GPP TSG RAN WG1 #105-e, Agenda Item: 8.8.1.3, Tdoc: R1-2105397 (Year: 2021).*
LG Electronics, Discussions on joint channel estimation for PUSCH, May 10, 2021, 3GPP TSG RAN WG1 #105-e, Agenda Item: 8.8.1.3, Tdoc: R1-2105490 (Year: 2021).*
Sierra Wireless, Design Considerations for Joint channel estimation for PUSCH, May 10, 2021, 3GPP TSG RAN WG1 #105-e, Agenda Item: 8.8.1.3, Tdoc: R1-2105509 (Year: 2021).*
Xiaomi, Joint channel estimation for PUSCH, May 10, 2021, 3GPP TSG RAN WG1 #105-e, Agenda Item: 8.8.1.3, Tdoc: R1-2105577 (Year: 2021).*
Ericsson, Joint Channel Estimation for PUSCH, May 10, 2021, 3GPP TSG RAN WG1 #105-e, Agenda Item: 8.8.1.3, Tdoc: R1-2105654 (Year: 2021).*
Lenovo et al., Enhancements for joint channel estimation for multiple PUSCH, May 10, 2021, 3GPP TSG RAN WG1 #105-e, Agenda Item: 8.8.1.3, Tdoc: R1-2105775 (Year: 2021).*
Wilus Inc., Discussion on joint channel estimation for PUSCH, May 10, 2021, 3GPP TSG RAN WG1 #105-e, Agenda Item: 8.8.1.3, Tdoc: R1-2105879 (Year: 2021).*
Nokia et al., Joint channel estimation for PUSCH coverage enhancements, May 10, 2021, 3GPP TSG RAN WG1 #105-e, Agenda Item: 8.8.1.3, Tdoc: R1-2105903 (Year: 2021).*
Moderator (China Telecom), FL Summary of joint channel estimation for PUSCH, May 10, 2021, 3GPP TSG RAN WG1 #105-e, Agenda Item: 8.8.1.3, Tdoc: R1-2105979 (Year: 2021).*
Moderator (China Telecom), Summary of email discussion on joint channel estimation for PUSCH, May 10, 2021, 3GPP TSG RAN WG1 #105-e, Agenda Item: 8.8.1.3, Tdoc: R1-2106152 (Year: 2021).*
International Search Report and Written Opinion of the International Searching Authority dated Nov. 4, 2022, in connection with International Application No. PCT/KR2022/011470, 8 pages.
NTT Docomo Inc, "Joint channel estimation for PUSCH," R1-2105713, 3GPP TSG RAN WG1 #105-e, e-Meeting, May 10-27, 2021, 7 pages.
Sharp, "Joint channel estimation for multi-slot PUSCH," R1-2105642, 3GPP TSG RAN WG1 #105-e, e-Meeting, May 10-27, 2021, 9 pages.
Vivo, "Discussion on Joint channel estimation for PUSCH," R1-2104378, 3GPP TSG RAN WG1 #105-e, e-Meeting, May 10-27, 2021, 12 pages.
ZTE Corporation, "Discussion on joint channel estimation for PUSCH," R1-2104332, 3GPP TSG RAN WG1 #105-e, e-Meeting, May 10-27, 2021, 12 pages.
3GPP TS 38.211 V16.6.0 (Jun. 2021), Technical Specification, 3rd Generation Partnership Project; Technical Specification Group Radio Access Network; NR; Physical channels and modulation (Release 16), Jun. 2021, 134 pages.
3GPP TS 38.213 V18.0.0 (Sep. 2023), Technical Specification, 3rd Generation Partnership Project; Technical Specification Group Radio Access Network; NR; Physical layer procedures for control (Release 18), Sep. 2023, 285 pages.
3GPP TS 38.214 V17.2.0 (Jun. 2022), Technical Specification, 3rd Generation Partnership Project; Technical Specification Group Radio Access Network; NR; Physical layer procedures for data (Release 17), Jun. 2022, 228 pages.
China Telecom, "FL Summary of joint channel estimation for PUSCH," R1-2105979, 3GPP TSG RAN WG1 Meeting #105-e, May 10- 27, 2021, 36 pages.
Office Action dated Jun. 5, 2026, in connection with Chinese Application No. 202280053730.0, 18 pages.

* cited by examiner

METHOD AND DEVICE FOR UPLINK CHANNEL TRANSMISSION IN WIRELESS COMMUNICATION SYSTEM

TECHNICAL FIELD

The disclosure relates to a method and a device for transmitting or receiving an uplink channel by a base station or a terminal in a wireless communication system.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz, bands (for example, 95 GHz to 3 THz bands) in order to accomplish transmission rates fifty times faster than 5G mobile communication technologies and ultra-low latencies one-tenth of 5G.

In the initial stage of 5G mobile communication technologies, in order to support services and to satisfy performance requirements in connection with enhanced Mobile BroadBand, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving. Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR, VR, and the like (XR=AR+VR+MR), 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies. Full Dimensional MIMO (FD-MIMO), multi-antenna transmission technologies such as array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

According to the recent development of 5G communication systems, the need for a method of uplink repetition for enlargement of cell coverage in an ultra-high frequency (mmWave) band has come to the fore.

DISCLOSURE OF INVENTION

Technical Problem

The disclosure proposes a configuration method and a device for performing joint channel estimation in multi-PUSCH transmission for improvement of uplink channel coverage in a wireless communication system.

The technical subjects pursued in the disclosure may not be limited to the above mentioned technical subjects, and other technical subjects which are not mentioned may be clearly understood, through the following descriptions, by those skilled in the art to which the disclosure pertains.

Solution to Problem

According to an embodiment of the disclosure, a method performed by a terminal of a wireless communication system is provided. The method includes receiving, from a base station, a message including first information on a length of a time domain window (TDW) and second information indicating whether physical uplink shared channel (PUSCH) repetitions counted based on slots available in PUSCH transmission are activated, determining at least one TDW, based on the first information and the second information, and transmitting a PUSCH to the base station while maintaining power consistency and phase continuity, based on the determined at least one TDW.

According to an embodiment of the disclosure, a method performed by a base station of a wireless communication system is provided. The method includes transmitting, to a terminal, a message including first information on a length of a TDW and second information indicating whether PUSCH repetitions counted based on slots available in PUSCH transmission are activated, determining at least one TDW, based on the first information and the second information, and receiving a PUSCH transmitted by the terminal while maintaining power consistency and phase continuity, based on the determined at least one TDW.

According to an embodiment of the disclosure, a terminal of a wireless communication system is provided. The terminal includes a transceiver and a controller. The controller is configured to control the transceiver to receive, from a base station, a message including first information on a length of a TDW and second information indicating whether PUSCH repetitions counted based on slots available in PUSCH transmission are activated, determine at least one TDW, based on the first information and the second information, and control the transceiver to transmit a PUSCH to the base station while maintaining power consistency and phase continuity, based on the determined at least one TDW.

According to an embodiment of the disclosure, a base station of a wireless communication system is provided. The base station includes a transceiver and a controller. The controller is configured to control the transceiver to transmit, to a terminal, a message including first information on a length of a TDW and second information indicating whether PUSCH repetitions counted based on slots available in PUSCH transmission are activated, determine at least one TDW, based on the first information and the second information, and control the transceiver to receive a PUSCH transmitted by the terminal while maintaining power consistency and phase continuity, based on the determined at least one TDW.

Advantageous Effects of Invention

According to an embodiment of the disclosure, a method of configuring a time domain window for performing a joint channel operation at the time of joint channel estimation for multi-PUSCH transmission is provided.

Through the method of the disclosure, the performance of channel estimation is improved and thus uplink channel coverage may be increased.

Advantageous effects obtainable from the disclosure may not be limited to the above mentioned effects, and other effects which are not mentioned may be clearly understood, through the following descriptions, by those skilled in the art to which the disclosure pertains.

MODE FOR THE INVENTION

Figure 1:
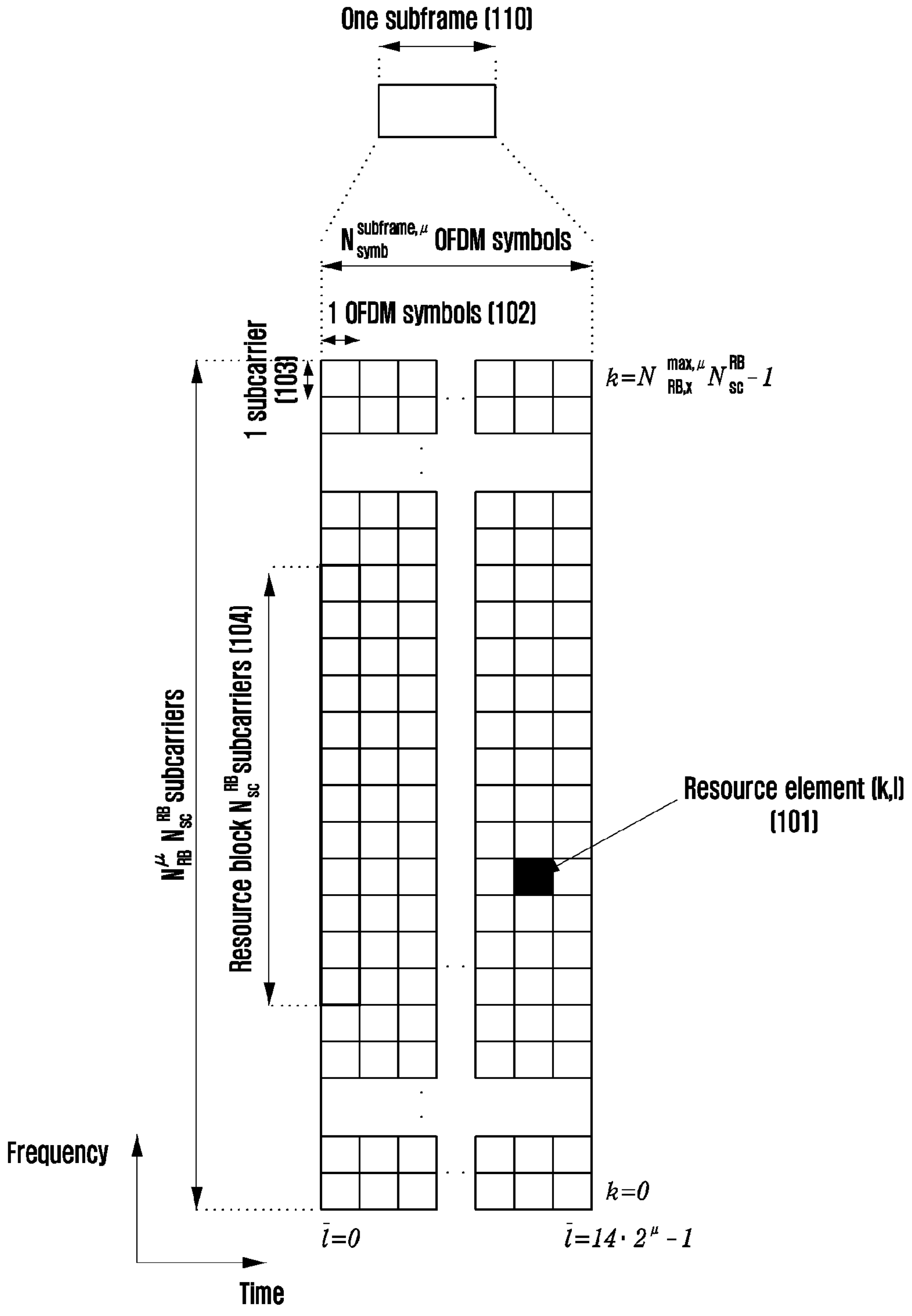
FIG. 1 is a diagram illustrating a basic structure of a time-frequency domain which is a wireless resource region in which data or a control channel is transmitted in a 5G system.

Hereinafter, embodiments of the disclosure will be described in detail with reference to the accompanying drawings. In the following description of embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Furthermore, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Furthermore, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions.

These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, the "unit" in the embodiments may include one or more processors.

Hereinafter, embodiments of the disclosure will be described in detail in conjunction with the accompanying drawings. In the following description of embodiments of the disclosure, the method and device proposed in the embodiments of the disclosure will be described as an example of enhancing PUSCH coverage, but the application thereof is not limited to the respective embodiments and it is possible to apply the method and device to frequency resource configuration methods corresponding to other channels by using all of one or more embodiments or combinations of some of them. Therefore, based on determinations by those skilled in the art, the embodiments of the disclosure may be applied through some modifications without significantly departing from the scope of the disclosure.

Furthermore, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.17e. and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) (or a mobile station (MS)) transmits data or control signals to a base station (BS) (eNode B), and the downlink indicates a radio link through which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like. eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system, mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and requires a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10–5 or less. Therefore, for the services supporting URLLC, a 5G system must provide a transmit time interval (TTI) shorter than those of other services, and also must assign a large number of resources in a frequency band in order to secure reliability of a communication link.

The three services in the 5G communication system (hereinafter may be interchangeably used with "5G system), that is, eMBB, URLLC, and mMTC, may be multiplexed and transmitted in a single system. In this case, different transmission/reception techniques and transmission/reception parameters may be used between services in order to satisfy different requirements of the respective services.

Hereinafter, a frame structure of a 5G system will be described in detail with reference to the drawings.

FIG. 1 is a diagram illustrating a basic structure of a time-frequency domain which is a wireless resource region of a 5G system.

In FIG. 1, the transverse axis indicates a time domain, and the longitudinal axis indicates a frequency domain. A basic unit of resources in the time-frequency domain is a resource element (RE) 101, and may be defined by one orthogonal frequency division multiplexing (OFDM) symbol 102 (or a discrete Fourier transform spread OFDM (DFT-s-OFDM) symbol) in the time axis and one subcarrier 103 in the frequency axis. In the frequency domain, $$N_{sc}^{RB}$$

number (e.g., 12) of consecutive REs may configure one resource block (RB) 104. In addition, in the time domain, $$N_{symb}^{subframe}$$

number of consecutive OFDM symbols may configure one subframe 110.

Figure 2:
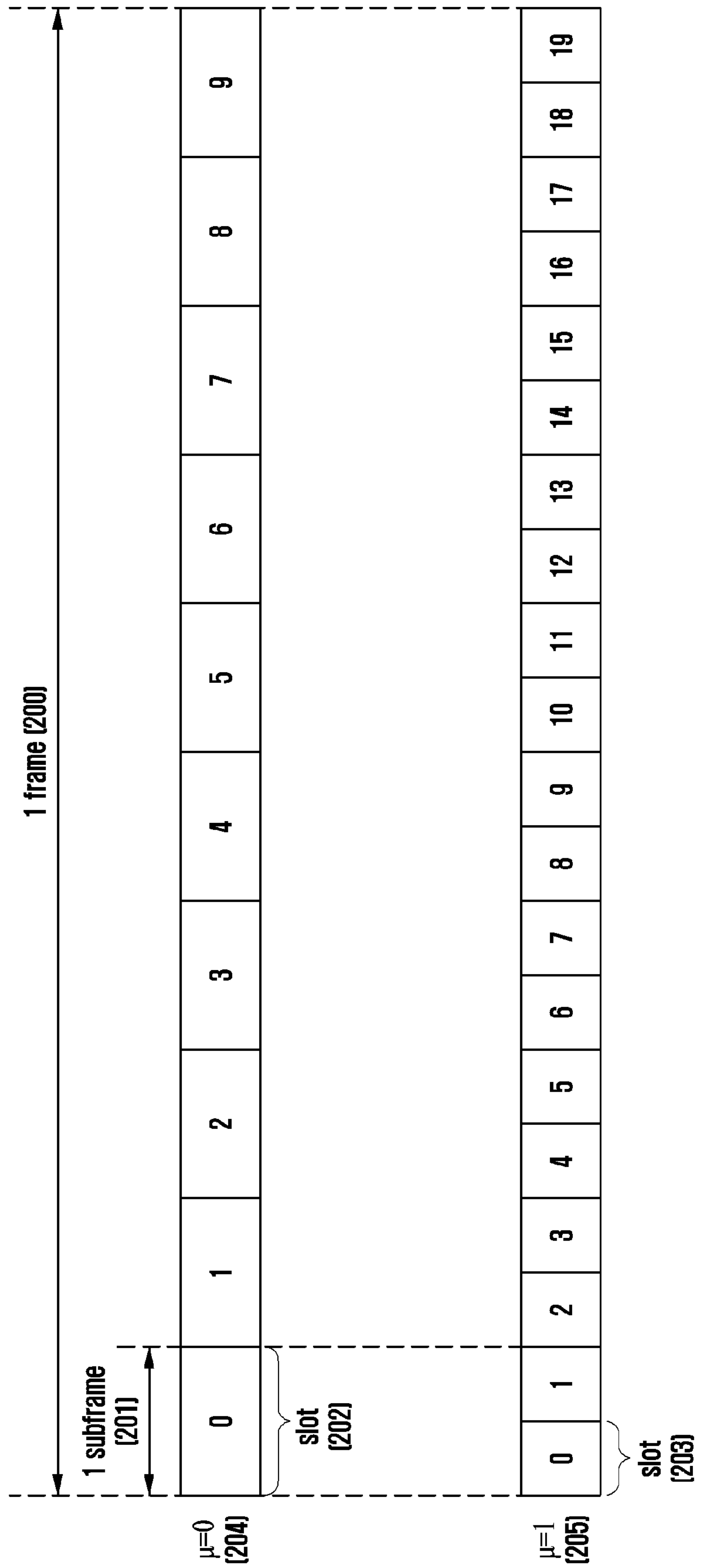
FIG. 2 is a diagram illustrating a slot structure considered in a 5G system.

FIG. 2 is a diagram illustrating a slot structure considered in a 5G system.

In FIG. 2, an example of a structure of a frame 200, a subframe 201, and a slot 202 is illustrated. The one frame 200 may be defined as 10 ms. The one subframe 201 may be defined as 1 ms, and thus the one frame 200 may be configured by a total of 10 subframes 201. Furthermore, one slot 202 or 203 may be defined as 14 OFDM symbols (i.e., the number $$(N_{symb}^{slot})$$

of symbols per one slot=14). The one subframe 201 may be configured by one slot 202 or multiple slots 203, and the number of the slots 202 or 203 per one subframe 201 may vary according to a configuration value μ 204 or 205 of subcarrier spacing (SCS).

In the example of FIG. 2, slot structures of a case of μ=0 (204) and a case of μ=1 (205) as a subcarrier spacing configuration value are illustrated. In the case of μ=0 (204), the one subframe 201 may be configured by the one slot 202, and in the case of μ=1 (205), the one subframe 201 may be configured by the two slots 203. That is, the number $$(N_{slot}^{subframe,\mu})$$

of slots per one subframe may vary according to a configuration value μ of a subcarrier spacing, and the number $$(N_{slot}^{frame,\mu})$$

of slots per one frame may vary accordingly, $$N_{slot}^{subframe,\mu}$$

and $$N_{slot}^{frame,\mu}$$

according to each subcarrier spacing configuration μ may be defined as shown below in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 170 | 17 |
| 5 | 14 | 320 | 32 |

Next, a demodulation reference signal (DMRS) that is one of reference signals in a 5G system will be described in detail.

A DMRS may be configured by several DMRS ports, and each port uses code division multiplexing (CDM) or frequency division multiplexing (FDM) to maintain orthogonality so as not to generate mutual interference. However, a term for DMRSs may be expressed by different terms according to a user's intent and the purpose of using reference signals. More specifically, the term "DMRS" merely corresponds to a particular example so as to easily describe technical contents of the disclosure and help the understanding of the disclosure and is not intended to limit the scope of the disclosure. That is, it is obvious to those skilled in the art to which the disclosure belongs that it is possible to carry out the disclosure for a random reference signal, based on the technical spirit of the disclosure.

Figure 3:
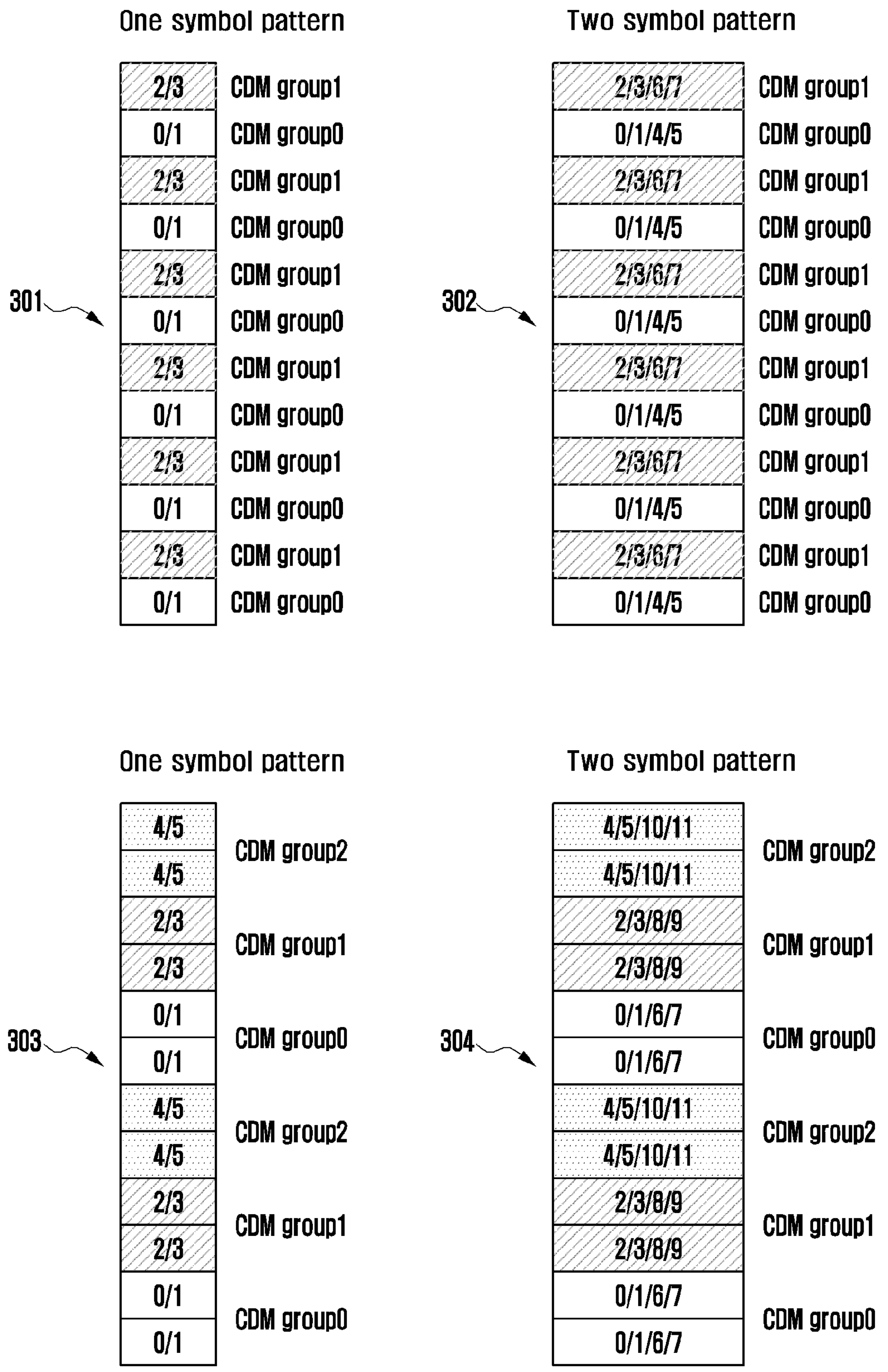
FIG. 3 is a diagram illustrating a DMRS pattern (type 1 and type 2) used in communication between a base station and a terminal in a 5G system.

FIG. 3 is a diagram illustrating a DMRS pattern (type 1 and type 2) used in communication between a base station and a terminal in a 5G system.

Two DMRS patterns may be supported in a 5G system. The two DMRS patterns are illustrated in detail in FIG. 3. Referring to FIG. 3, reference numerals 301 and 302 indicate DMRA type 1, reference numeral 301 indicates a 1 symbol pattern, and reference numeral 302 indicates a 2 symbol pattern. DMRS type 1 indicated by reference numerals 301 and 302 in FIG. 3 corresponds to a comb 2 structure DMRS pattern, and may be configured by two CDM groups, and different CDM groups may be FDMed.

In the 1 symbol pattern indicated by reference numeral 301 in FIG. 3, frequency domain CDM may be applied to the same CDM groups to distinguish between two DMRS ports, and thus a total of four orthogonal DMRS ports may be configured. DMRS port IDs mapped to CDM groups are illustrated in the pattern indicated by reference numeral 301 in FIG. 3 (in a case of downlink, DMRS port IDs are shown by adding +1000 to the illustrated numbers). In the 2 symbol pattern indicated by reference numeral 302 in FIG. 3, time/frequency domain CDM may be applied to the same CDM groups to distinguish between four DMRS ports, and thus a total of eight orthogonal DMRS ports may be configured. DMRS port IDs mapped to CDM groups are illustrated in the pattern indicated by reference numeral 302 in FIG. 3 (in a case of downlink, DMRS port IDs are shown by adding +1000 to the illustrated numbers).

DMRS type 2 indicated by reference numerals 303 and 304 in FIG. 3 corresponds to a DMRS pattern having a structure in which frequency domain orthogonal cover codes (FD-OCC) are applied to subcarriers adjacent on frequency, and may be configured by three CDM groups, and different CDM groups may be FDMed.

In the 1 symbol pattern indicated by reference numeral 303 in FIG. 3, frequency domain CDM may be applied to the same CDM groups to distinguish between two DMRS ports, and thus a total of six orthogonal DMRS ports may be configured. DMRS port IDs mapped to CDM groups are illustrated in the pattern indicated by reference numeral 303 in FIG. 3 (in a case of downlink, DMRS port IDs are shown by adding +1000 to the illustrated numbers). In the 2 symbol pattern indicated by reference numeral 304 in FIG. 3, time/frequency domain CDM may be applied to the same CDM groups to distinguish between four DMRS ports, and thus a total of 12 orthogonal DMRS ports may be configured. DMRS port IDs mapped to CDM groups are illustrated in the pattern indicated by reference numeral 304 in FIG. 3 (in a case of downlink, DMRS port IDs are shown by adding +1000 to the illustrated numbers).

As described above, in an NR system, two different DMRS patterns (the patterns indicated by reference numerals 301 and 302 or the patterns indicated by reference numerals 303 and 304 in FIG. 3) may be configured, and whether the DMRS pattern is the one symbol pattern 301 or 303, or the two adjacent symbol patterns 302 or 304 may be also configured. Moreover, in an NR system, DMRS port numbers are scheduled, and in addition, the number of CDM groups scheduled together for PDSCH rate matching may be configured and signaled. In addition, in a case of cyclic prefix based orthogonal frequency division multiplexing (CP-OFDM), both of the two DMRS patterns described above may be supported in DL and UL, and in a case of discrete Fourier transform spread OFDM (DFT-S-OFDM), only DMRS type 1 among the above DMRS patterns may be supported in UL. Furthermore, an additional DMRS may be supported to be configurable. A front-loaded DMRS indicates a first DMRS transmitted or received in the frontmost symbol in the time domain among DMRSs, and an additional DMRS may indicate a DMRS transmitted and/or received in a symbol after the front-loaded DMRS in the time domain. In an NR system, the number of additional DMRSs may be configured to be a minimum of 0 to a maximum of 3. In addition, in a case where an additional DMRS is configured, the same pattern as a front-loaded DMRS may be assumed. More specifically, when information relating to whether the described DMRS pattern type is type 1 or type 2, information relating to whether the DMRS pattern is a one symbol pattern or a two adjacent symbol pattern, and information on a DMRS port and the number of CDM groups used therewith are indicated for a front-loaded DMRS, in a case where an additional DMRS is additionally configured, it may be assumed that the same DMRS information as the front-loaded DMRS is configured for the additional DMRS.

More specifically, a downlink DMRS configuration described above may be configured through RRC signaling as shown in Table 2 below.

TABLE 2

```
DMRS-DownlinkConfig ::=                 SEQUENCE {
dmrs-Type    (DMRS    type                          configuration)
ENUMERATED {type2}     OPTIONAL,   -- Need S
dmrs-AdditionalPosition  (additional DMRS OFDM symbol     configuration)
ENUMERATED {pos0, pos1, pos3}            OPTIONAL,   -- Need S
maxLength (1 symbol or 2 symbol DMRS pattern-related        configuration)
ENUMERATED {len2}   OPTIONAL,   -- Need S
scramblingID0 (scrambling ID0)                    INTEGER (0..65535)
   OPTIONAL,   -- Need S
scramblingID1   (scrambling ID1)                  INTEGER (0..65535)
OPTIONAL,   -- Need S
phaseTrackingRS (PTRS configuration)             SetupRelease { PTRS-
DownlinkConfig   } OPTIONAL,   -- Need M
...
}
```

In addition, an uplink DMRS configuration described above may be configured through RRC signaling as shown in Table 3 below.

TABLE 3

```
DMRS-UplinkConfig ::=                SEQUENCE {
dmrs-Type                          (DMRS        type        configuration)
ENUMERATED                                                    {type2}
OPTIONAL,   -- Need S
dmrs-AdditionalPosition  (additional  DMRS  OFDM  symbol     configuration)
ENUMERATED                          {pos0,       pos1,         pos3}
OPTIONAL,   -- Need R
phaseTrackingRS   (PTRS configuration)                     SetupRelease
{ PTRS-UplinkConfig }                                  OPTIONAL,   --
Need M
maxLength  (1  symbol  or  2  symbol  DMRS  pattern-related  configuration)
ENUMERATED                                                    {len2}
OPTIONAL,   -- Need S
transformPrecodingDisabled                       SEQUENCE {
scramblingID0 (scrambling ID0)                    INTEGER (0..65535)
OPTIONAL,   -- Need S
scramblingID1   (scrambling ID0)                  INTEGER (0..65535)
OPTIONAL,   -- Need S
...
}
OPTIONAL,   -- Need R
transformPrecodingEnabled                              SEQUENCE {
nPUSCH-Identity                 (cell     ID      for      DFT-s-OFDM)
INTEGER(0..1007)
OPTIONAL,   -- Need S
sequenceGroupHopping (sequence group hopping)             ENUMERATED
{disabled}   OPTIONAL,   -- Need S
sequenceHopping (sequence hopping)              ENUMERATED {enabled}
OPTIONAL,   -- Need S
...
}
OPTIONAL,   -- Need R
...
}
```

Figure 4:
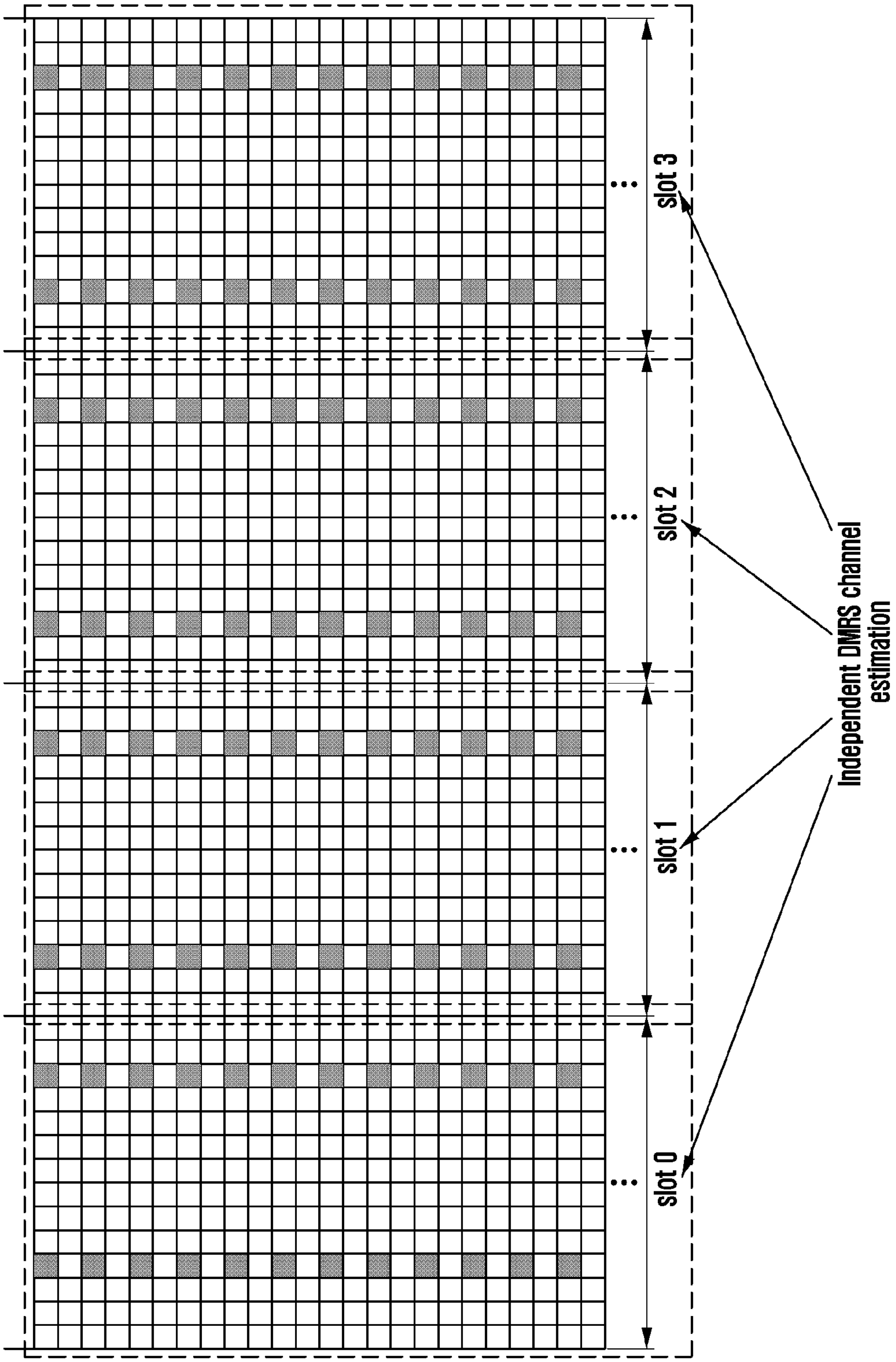
FIG. 4 is a diagram illustrating an example of channel estimation using a DMRS received in one PUSCH in a time band of a 5G system.

FIG. 4 is a diagram illustrating an example of channel estimation using a DMRS received in one PUSCH in a time band of a 5G system.

When channel estimation for data decoding is performed using a DMRS described above, the channel estimation may be performed in a precoding resource block group (PRG), which is a corresponding bundling unit, by using physical resource block (PRB) bundling linked with a system band in a frequency band. In addition, in a time unit, a channel is estimated under an assumption that precoding is the same for only DMRSs received in one PUSCH.

Figure 5:
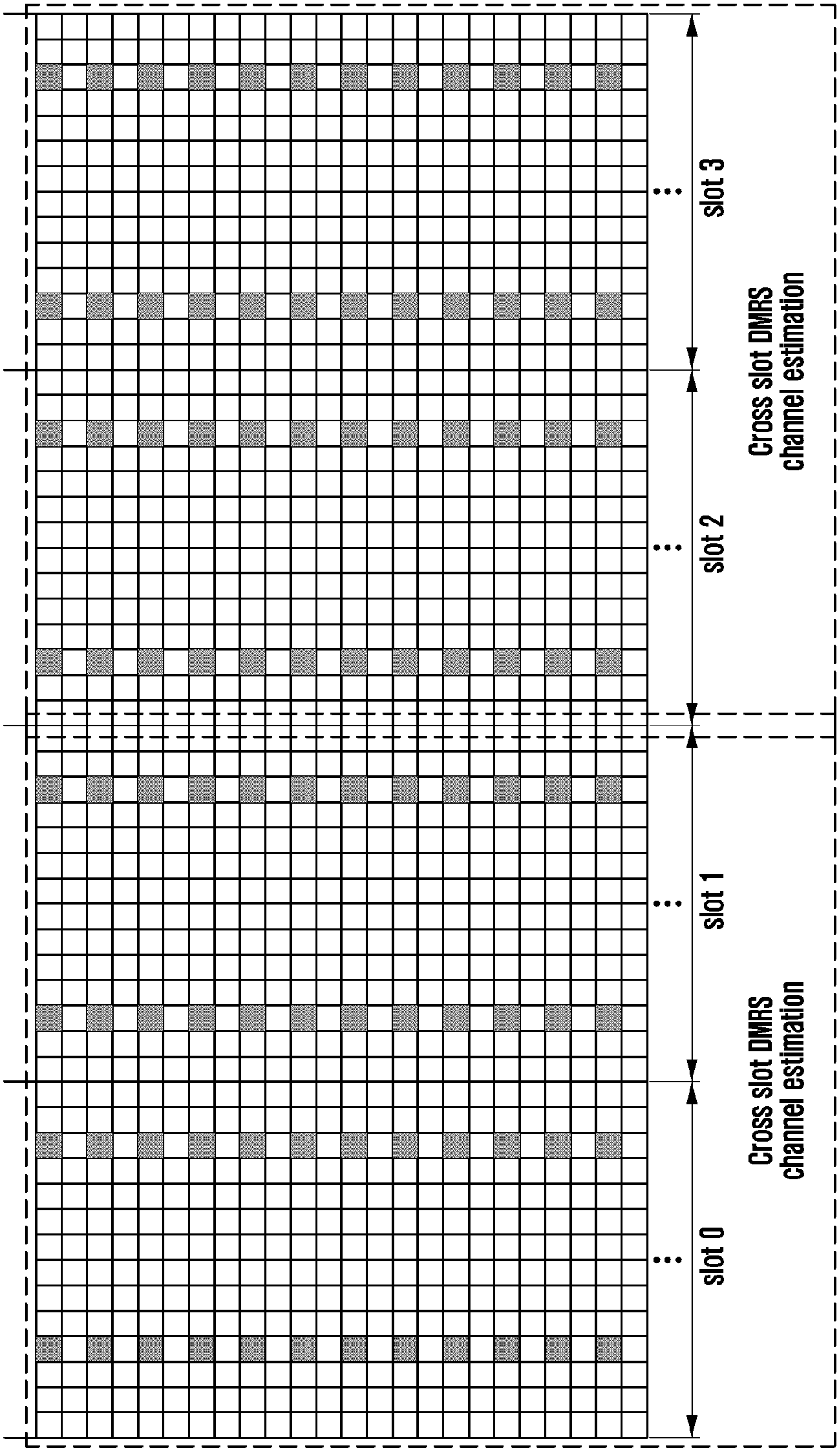
FIG. 5 is a diagram illustrating an example of joint channel estimation using DMRSs received in multiple PUSCHs in a time band of a 5G system.

FIG. 5 is a diagram illustrating an example of joint channel estimation using DMRSs received in multiple PUSCHs in a time band of a 5G system.

A base station may indicate, through configuration, whether a terminal is to use the same precoding. By means of the indication, the base station may estimate a channel by collectively using DMRS transmissions using the same precoding, and may increase DMRS channel estimation performance accordingly. In order to perform joint channel estimation, transmission power consistency (power consistency) and phase continuity are required to be maintained. For maintenance of the power consistency and the phase continuity, configuration of the same power and phase, the same RBs, and the same MCS is required, and DL transmission/reception and monitoring is not allowed between PUSCHs/PUCCHs in which joint channel estimation is performed. When the power consistency and the phase continuity are maintained through the configuration, joint channel estimation using DMRSs of multiple PUSCHs is possible.

Similarly to FIG. 4, also in FIG. 5, when channel estimation for data decoding is performed using a DMRS, the channel estimation may be performed within a precoding resource block group (PRG), which is a corresponding bundling unit, by using PRB bundling linked with a system band in a frequency band. In addition, in a time unit, a channel is estimated under an assumption that precoding is the same for DMRSs received in one or more PUSCHs. Accordingly, channel estimation based on several DMRSs is possible in a time band, and thus the performance of channel estimation may be improved. Particularly, for coverage improvement, since channel estimation performance may be bottlenecked even when data decoding performance is good, channel estimation performance may be very important.

Hereinafter, a method of allocating time domain resources for a data channel in a 5G communication system will be described. A base station may configure, for a terminal, a table relating to time domain resource allocation information for a downlink data channel (physical downlink shared channel, PDSCH) and an uplink data channel (physical uplink shared channel, PUSCH) through higher layer signaling (e.g., RRC signaling).

The base station may configure, for a PDSCH, a table configured by a maximum of 17 entries (maxNrofDL-Allocations=17), and may configure, for a PUSCH, a table configured by a maximum of 17 entries (maxNrofUL-Allocations=17). Time domain resource allocation information may include, for example, PDCCH-to-PDSCH slot timing (this corresponds to a time interval expressed in the unit of slots between a time point at which a PDCCH is received and a time point at which a PDSCH scheduled by the received PDCCH is transmitted, and is represented by K0) or PDCCH-to-PUSCH slot timing (i.e., this corresponds to a time interval expressed in the unit of slots between a time point at which a PDCCH is received and a time point at which a PUSCH scheduled by the received PDCCH is transmitted, and is represented by K2), information relating to the starting symbol position and the length of a PDSCH or a PUSCH scheduled in a slot, and a PDSCH or PUSCH mapping type. For example, time domain resource allocation information for a PDSCH may be configured for the terminal through an RRC signal as shown in Table 4 below.

TABLE 4

| PDSCH-TimeDomainResourceAllocationList information element |
|---|
| PDSCH-TimeDomainResourceAllocationList ::= SEQUENCE (SIZE(1..maxNrofDL-Allocations)) OF PDSCH-TimeDomainResourceAllocation<br>PDSCH-TimeDomainResourceAllocation ::= SEQUENCE {<br>k0 INTEGER(0..32)<br>OPTIONAL, -- Need S<br>(PDCCH-to-PDSCH timing, unit of slots)<br>mappingType ENUMERATED {typeA, typeB},<br>(PDSCH mapping type)<br>startSymbolAndLength INTEGER (0..127)<br>(starting symbol and length of PDSCH)<br>} |

In addition, for example, time domain resource allocation information for a PUSCH may be configured for the terminal through an RRC signal as shown in Table 5 below.

TABLE 5

| PUSCH-TimeDomainResourceAllocation information element |
|---|
| PUSCH-TimeDomainResourceAllocationList ::= SEQUENCE (SIZE(1..maxNrofUL-Allocations)) OF PUSCH-TimeDomainResourceAllocation<br>PUSCH-TimeDomainResourceAllocation ::= SEQUENCE {<br>k2 INTEGER(0..32)<br>OPTIONAL, -- Need S<br>(PDCCH-to-PUSCH timing, unit of slots)<br>mappingType ENUMERATED {typeA, typeB},<br>(PUSCH mapping type)<br>startSymbolAndLength INTEGER (0..127)<br>(starting symbol and length of PUSCH)<br>} |

The base station may indicate, to the terminal, one of the entries of the table relating to the time domain resource allocation information through L1 signaling (e.g., downlink control information (DCI)) (e.g., the base station may indicate same through a “time domain resource allocation” field in DCI). The terminal may obtain time domain resource allocation information for a PDSCH or PUSCH, based on the DCI received from the base station.

Hereinafter, transmission of an uplink data channel (a physical uplink shared channel (PUSCH)) in a 5G system will be described in detail. PUSCH transmission may be dynamically scheduled by a UL grant in DCI, or may be operated by configured grant Type 1 or Type 2. Dynamic scheduling for PUSCH transmission may be indicated by, for example, DCI format 0_0 or 0_1.

Configured grant Type 1 PUSCH transmission may be semi-statically configured through reception of configuredGrantConfig including rrc-ConfiguredUplinkGrant shown in [Table 6] through higher signaling without reception of a UL grant in DCI. Configured grant Type 2 PUSCH transmission may be semi-persistently scheduled by an UL grant in DCI after reception of configuredGrantConfig not including rrc-ConfiguredUplinkGrant shown in [Table 6] through higher signaling. In a case where PUSCH transmission is operated by a configured grant, parameters applied to the PUSCH transmission may be applied through configuredGrantConfig, which is higher signaling of [Table 6], except for particular parameters (e.g., dataScramblingIdentityPUSCH, txConfig, codebookSubset, maxRank, and scaling of UCI-OnPUSCH) provided by pusch-Config shown in [Table 7], which is higher signaling. For example, when transformPrecoder in configuredGrantConfig, which is higher signaling of [Table 6], is provided to the terminal, the terminal may apply tp-pi2BPSK in pusch-Config of [Table 7] to a PUSCH transmission operated by a configured grant.

TABLE 6

ConfiguredGrantConfig

```
ConfiguredGrantConfig ::=          SEQUENCE {
frequencyHopping                     ENUMERATED {intraSlot, interSlot}
OPTIONAL,   -- Need S,
cg-DMRS-Configuration                DMRS-UplinkConfig,
mcs-Table                                       ENUMERATED {qam256,
qam64LowSE}                                                 OPTIONAL,
-- Need S
mcs-TableTransformPrecoder                     ENUMERATED {qam256,
qam64LowSE}                                                 OPTIONAL,
-- Need S
uci-OnPUSCH                                         SetupRelease { CG-UCI-
OnPUSCH }                                                OPTIONAL,  --
Need M
resourceAllocation                                       ENUMERATED
{ resourceAllocationType0, resourceAllocationType1, dynamicSwitch },
rbg-Size                                       ENUMERATED {config2}
OPTIONAL,   -- Need S
powerControlLoopToUse                ENUMERATED {n0, n1},
p0-PUSCH-Alpha                        P0-PUSCH-AlphaSetId,
transformPrecoder                    ENUMERATED {enabled, disabled}
OPTIONAL,   -- Need S
nrofHARQ-Processes                   INTEGER(1..17),
repK                                  ENUMERATED {n1, n2, n4, n8},
repK-RV                                ENUMERATED {s1-0231, s2-0303,
s3-0000}                                   OPTIONAL,   -- Need R
periodicity                           ENUMERATED {
sym2, sym7, sym1x14, sym2x14, sym4x14, sym5x14, sym8x14, sym10x14,
sym17x14, sym20x14,
sym32x14, sym40x14, sym64x14, sym80x14, sym128x14, sym170x14,
sym256x14, sym320x14, sym512x14,
sym640x14, sym1024x14, sym1280x14, sym2560x14, sym5120x14,
sym6, sym1x12, sym2x12, sym4x12, sym5x12, sym8x12, sym10x12, sym17x12,
sym20x12, sym32x12,
sym40x12, sym64x12, sym80x12, sym128x12, sym170x12, sym256x12,
sym320x12, sym512x12, sym640x12,
sym1280x12, sym2560x12
},
configuredGrantTimer                                  INTEGER (1..64)
OPTIONAL,   -- Need R
rrc-ConfiguredUplinkGrant             SEQUENCE {
timeDomainOffset                          INTEGER (0..5119),
timeDomainAllocation                      INTEGER (0..16),
frequencyDomainAllocation                BIT STRING (SIZE(18)),
antennaPort                               INTEGER (0..31),
dmrs-SeqInitialization                                INTEGER (0..1)
OPTIONAL,   -- Need R
precodingAndNumberOfLayers                INTEGER (0..63),
srs-ResourceIndicator                                 INTEGER (0..16)
OPTIONAL,   -- Need R
mcsAndTBS                                    INTEGER (0..31),
frequencyHoppingOffset                                 INTEGER (1..
maxNrofPhysicalResourceBlocks-1)                      OPTIONAL,  --
Need R
pathlossReferenceIndex                    INTEGER (0..maxNrofPUSCH-
PathlossReferenceRSs-1),
...
}
OPTIONAL,   -- Need R
...
}
```

Next, a PUSCH transmission method is described. A DMRS antenna port for PUSCH transmission may be the same as an antenna port for SRS transmission. PUSCH transmission may follow each of a codebook-based transmission method and a non-codebook-based transmission method according to whether the value of txConfig in pusch-Config of [Table 7], which is higher signaling, is a "codebook" or a "nonCodebook". As described above, PUSCH transmission may be dynamically scheduled through DCI format 0_0 or 0_1, and may be semi-statically configured by a configured grant.

If scheduling for a PUSCH transmission is indicated to the terminal through DCI format 0_0, the terminal may perform beam configuration for the PUSCH transmission by using pucch-spatialRelationInfoID corresponding to a terminal (UE)-specific (dedicated) PUCCH resource having the lowest ID in an uplink bandwidth part (BWP) activated in a serving cell. The PUSCH transmission may be performed based on a single antenna port. The terminal may not expect scheduling for PUSCH transmission through DCI format 0_0 within a BWP in which a PUCCH resource including pucch-spatialRelationInfo is not configured. If txConfig in pusch-Config of [Table 7] is not configured for the terminal, the terminal may not expect to be scheduled through DCI format 0_1.

TABLE 7

PUSCH-Config

```
PUSCH-Config ::=                                    SEQUENCE {
dataScramblingIdentityPUSCH                                 INTEGER (0..1023)
OPTIONAL,   -- Need S
txConfig                                               ENUMERATED {codebook,
nonCodebook}  OPTIONAL,   -- Need S
dmrs-UplinkForPUSCH-MappingTypeA                    SetupRelease { DMRS-
UplinkConfig } OPTIONAL,   -- Need M
dmrs-UplinkForPUSCH-MappingTypeB                    SetupRelease { DMRS-
UplinkConfig }  OPTIONAL,   -- Need M
pusch-PowerControl                                        PUSCH-PowerControl
OPTIONAL,   -- Need M
frequencyHopping                                    ENUMERATED {intraSlot,
interSlot}      OPTIONAL,   -- Need S
frequencyHoppingOffsetLists     SEQUENCE (SIZE (1..4)) OF INTEGER (1..
maxNrofPhysicalResourceBlocks-1)
OPTIONAL,   -- Need M
resourceAllocation                                               ENUMERATED
{ resourceAllocationType0, resourceAllocationType1, dynamicSwitch},
pusch-TimeDomainAllocationList                       SetupRelease { PUSCH-
TimeDomainResourceAllocationList }               OPTIONAL,   -- Need M
pusch-AggregationFactor           ENUMERATED { n2, n4, n8 }
OPTIONAL,   -- Need S
mcs-Table                         ENUMERATED   {qam256, qam64LowSE}
OPTIONAL,   -- Need S
mcs-TableTransformPrecoder       ENUMERATED   {qam256, qam64LowSE}
OPTIONAL,   -- Need S
transformPrecoder                       ENUMERATED   {enabled,   disabled}
OPTIONAL,   -- Need S
codebookSubset     ENUMERATED   {fullyAndPartialAndNonCoherent,
partialAndNonCoherent, nonCoherent}
OPTIONAL, -- Cond codebookBased
maxRank                                             INTEGER (1..4) OPTIONAL, --
Cond codebookBased
rbg-Size                                                ENUMERATED { config2}
OPTIONAL, -- Need S
uci-OnPUSCH                                                    SetupRelease { UCI-
OnPUSCH}      OPTIONAL, -- Need M
tp-pi2BPSK                                              ENUMERATED {enabled}
OPTIONAL, -- Need S
...
}
```

semi-statically operated by a configured grant. If a codebook-based PUSCH is dynamically scheduled by DCI format 0_1 or is semi-statically operated by a configured grant, the terminal may determine a precoder for PUSCH transmission, based on an SRS resource indicator (SRI), a transmission precoding matrix indicator (TPMI), and a transmission rank (the number of PUSCH transmission layers).

The SRI may be given through an SRS resource indicator, which is a field in DCI, or may be configured through srs-ResourceIndicator which is higher signaling. At least one SRS resource may be configured for the terminal at the time of codebook-based PUSCH transmission, and for example, a maximum of two SRS resources may be configured. In a case where an SRI is provided to the terminal through DCI, an SRS resource indicated by the SRI may mean an SRS resource corresponding to the SRI among SRS resources transmitted before a PDCCH including the SRI. In addition, a TPMI and a transmission rank may be given through precoding information and number of layers, which is a field in DCI, or may be configured by precodingAndNumberOfLayers which is higher signaling. A TPMI may be used to indicate a precoder applied to PUSCH transmission.

A precoder to be used for PUSCH transmission may be selected from an uplink codebook having the same number Next, codebook-based PUSCH transmission is described. Codebook-based PUSCH transmission may be dynamically scheduled through DCI format 0_0 or 0_1, and may be of antenna ports as the value of nrofSRS-Ports in SRS-Config which is higher signaling. In codebook-based PUSCH transmission, the terminal may determine a codebook subset, based on a TPMI and codebookSubset in pusch-Config which is higher signaling. The codebookSubset in pusch-Config which is higher signaling may be configured to be one of "fully AndPartialAndNonCoherent", "partialAndNonCoherent", or "nonCoherent", based on a UE capability reported to the base station by the terminal.

If the terminal reports "partialAndNonCoherent" as a UE capability, the terminal may not expect that the value of codebookSubset which is higher signaling is configured to be "fully AndPartialAndNonCoherent". In addition, if the terminal reports "nonCoherent" as a UE capability, the terminal may not expect that the value of codebookSubset which is higher signaling is configured to be "fully AndPartialAndNonCoherent" or "partialAndNonCoherent". In a case where nrofSRS-Ports in SRS-ResourceSet which is higher signaling indicates two SRS antenna ports, the terminal may not expect that the value of codebookSubset which is higher signaling is configured to be "partialAndNonCoherent".

One SRS resource set configured to have "codebook" as the value of usage in SRS-ResourceSet which is higher signaling may be configured for the terminal, and one SRS resource in the SRS resource set may be indicated through an SRI. If several SRS resources are configured in an SRS resource set configured to have "codebook" as the value of usage in SRS-ResourceSet which is higher signaling, the terminal may expect that the value of nrofSRS-Ports in SRS-Resource which is higher signaling is configured to be identical for all the SRS resources.

The terminal may transmit, to the base station, one or multiple SRS resources included in an SRS resource set configured to have "codebook" as the value of usage according to higher signaling, and the base station may select one from among the SRS resources transmitted by the terminal, and indicate the terminal to perform a PUSCH transmission by using transmission beam information of the SRS resource. In codebook-based PUSCH transmission, an SRI is used as information for selecting the index of one SRS resource, and may be included in DCI. Additionally, the base station may transmit information indicating a TPMI and a rank to be used by the terminal for PUSCH transmission, after including the information in DCI. The terminal may use an SRS resource indicated by the SRI, to apply a precoder indicated by the indicated TPMI and rank, based on a transmission beam of the SRS resource, so as to perform PUSCH transmission.

Next, non-codebook-based PUSCH transmission is described. Non-codebook-based PUSCH transmission may be dynamically scheduled through DCI format 0_0 or 0_1, or may be semi-statically operated by a configured grant. In a case where at least one SRS resource is configured in an SRS resource set configured to have "nonCodebook" as the value of usage in SRS-ResourceSet which is higher signaling, a non-codebook-based PUSCH transmission may be scheduled for the terminal through DCI format 0_1.

With respect to an SRS resource set configured to have "nonCodebook" as the value of usage in SRS-ResourceSet which is higher signaling, a non-zero power (NZP) CSI-RS resource associated with one SRS resource set may be configured for the terminal. The terminal may perform calculation for a precoder for SRS transmission through a measurement of an NZP CSI-RS resource configured in association with an SRS resource set. In a case where a difference between the first symbol of an aperiodic SRS transmission by the terminal, and the last reception symbol of an aperiodic NZP CSI_RS resource associated with an SRS resource set is smaller than particular symbols (e.g., 42 symbols), the terminal may not expect that information on a precoder for an SRS transmission is updated.

If the value of resourceType in SRS-ResourceSet which is higher signaling is configured to be "aperiodic", an NZP CSI-RS associated with the SRS-ResourceSet may be indicated by SRS request which is a field in DCI format 0_1 or 1_1. In a case where an NZP CSI-RS resource associated with SRS-ResourceSet is an aperiodic NZP CSI resource, and the value of SRS request which is a field in DCI format 0_1 or 1_1 is not "00", existence of an NZP CSI-RS associated with SRS-ResourceSet may be indicated. The DCI is required not to indicate cross carrier or cross BWP scheduling. In addition, if the value of SRS request indicates existence of an NZP CSI-RS, the NZP CSI-RS may be positioned in a slot in which a PDCCH including the SRS request field is transmitted. TCI states configured for scheduled subcarriers may not be configured to be QCL-TypeD.

If a periodic or semi-persistent SRS resource set is configured, an NZP CSI-RS associated with the SRS resource set may be indicated through associatedCSI-RS in SRS-ResourceSet which is higher signaling. With respect to a non-codebook-based transmission, the terminal may not expect that spatialRelationInfo which is higher signaling for an SRS resource and associatedCSI-RS in SRS-ResourceSet which is higher signaling are configured together.

In a case where multiple SRS resources are configured for the terminal, the terminal may determine a precoder and a transmission rank to be applied to PUSCH transmission, based on an SRI indicated by the base station. The SRI may be indicated through an SRS resource indicator, which is a field in DCI, or may be configured through srs-ResourceIndicator which is higher signaling. Similarly to codebook-based PUSCH transmission described above, in a case where an SRI is provided to the terminal through DCI, an SRS resource indicated by the SRI may mean an SRS resource corresponding to the SRI among SRS resources transmitted before a PDCCH including the SRI. The terminal may use one or multiple SRS resources for an SRS transmission, and a maximum number of SRS resources and a maximum number of SRS resources which are simultaneously transmittable in the same symbol in one SRS resource set may be determined by a UE capability reported by the terminal to the base station. The SRS resources simultaneously transmitted by the terminal may occupy the same RB. The terminal may configure one SRS port for each SRS resource. Only one SRS resource set is possible as SRS resource sets configured to have "nonCodebook" as the value of usage in SRS-ResourceSet which is higher signaling, and configuration of a maximum of four SRS resources is possible for non-codebook-based PUSCH transmission.

The base station may transmit one NZP CSI-RS associated with an SRS resource set to the terminal, and the terminal may calculate a precoder to be used for transmission of one or multiple SRS resources in the SRS resource set, based on a result of measurement upon reception of the NZP CSI-RS. When one or multiple SRS resources in an SRS resource set configured to have "nonCodebook" as usage are transmitted to the base station, the terminal may apply the calculated precoder, and the base station may select one or multiple SRS resources among the received one or multiple SRS resources. In non-codebook-based PUSCH transmission, an SRI may indicate an index capable of representing one or a combination of multiple SRS resources, and the SRI may be included in DCI. The number of SRS resources indicated by an SRI transmitted by the base station may be the number of transmission layers of a PUSCH, and the terminal may transmit a PUSCH by applying a precoder applied to an SRS resource transmission to each of the layers.

Next, PUSCH repetitive transmission (PUSCH repetition) is described. When a PUSCH transmission is scheduled for the terminal through DCI format 0_1 in a PDCCH including a CRC scrambled with a C-RNTI, an MCS-C-RNTI, or a CS-RNTI, if pusch-AggregationFactor which is higher layer signaling is configured for the terminal, the same symbol allocation may be applied in as many consecutive slots as pusch-AggregationFactor, and the PUSCH transmission may be limited to a single rank transmission. For example, the terminal is required to repeat the same transport block (TB) in as many consecutive slots as pusch-AggregationFactor, and apply the same symbol allocation to each of the slots. [Table 8] shows a redundancy version applied to PUSCH repetition for each slot. If a PUSCH repetition in multiple slots is scheduled for the terminal through DCI format 0_1, and at least one symbol in the slots in which the PUSCH repetition is performed is indicated as a downlink symbol according to information of tdd-UL-DL-ConfigurationCommon or tdd-UL-DL-ConfigurationDedicated which is higher layer signaling, the terminal may not perform PUSCH transmission in a slot in which the symbol is positioned.

TABLE 8

| $rv_{id}$ indicated by the DCI scheduling | $rv_{id}$ to be applied to $n^{th}$ transmission occasion | | | |
|---|---|---|---|---|
| the PUSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Hereinafter, repetition of an uplink data channel (PUSCH) in a 5G system will be described in detail. A 5G system may support two types, for example, including PUSCH repetition type A and PUSCH repetition type B as a method of repeatedly transmitting an uplink data channel. One of PUSCH repetition type A or B may be configured for a terminal through higher layer signaling.

PUSCH Repetition Type A

As described above, the starting symbol and the length of an uplink data channel may be determined in one slot by the above time domain resource allocation method, and a base station may transmit a repetition count to the terminal through higher layer signaling (e.g., RRC signaling) or L1 signaling (e.g., DCI).

The terminal may repeatedly transmit, in consecutive slots, an uplink data channel having the same starting symbol and the same length as the configured uplink data channel, based on the repetition count received from the base station. The terminal may omit uplink data channel transmission in a slot configured as downlink for the terminal by the base station, or in a slot, which is configured for the terminal for uplink data channel repetition, and which has at least one symbol configured as downlink among the symbols thereof. For example, the uplink data channel transmission may be included in an uplink data channel repetition count, but may not be performed. On the other hand, a terminal supporting Rel-17 uplink data repetition may determine, as an available slot, a slot in which uplink data repetition is possible, and an uplink data channel repetition in the slot determined as the available slot may be counted. When an uplink data channel repetition in a slot determined as the available slot is omitted, the uplink data channel may be postponed and then be repeatedly transmitted in a slot in which transmission is possible.

PUSCH Repetition Type B

As described above, the starting symbol and the length of an uplink data channel may be determined in one slot by the time domain resource allocation method, and the base station may transmit numberofrepetitions, which is a repetition count, to the terminal through higher signaling (e.g., RRC signaling) or L1 signaling (e.g., DCI).

First, a nominal repetition of the uplink data channel may be determined as below, based on the configured starting symbol and the length of the uplink data channel. The nominal repetition may indicate a resource of a symbol configured for PUSCH repetition by the base station, and the terminal may determine a resource available as uplink in the configured nominal repetition. In this case, a slot in which the n-th nominal repetition starts may be given by $$K_s+\left\lfloor\frac{S+n\cdot L}{N_{symb}^{slot}}\right\rfloor,$$

and a symbol in which the nominal repetition starts in the starting slot may be given by $$\mathrm{mod}\left(S+n\cdot L,\ N_{symb}^{slot}\right)$$

A slot in which the n-th nominal repetition ends may be given by $$K_s+\left\lfloor\frac{S+(n+1)\cdot L-1}{N_{symb}^{slot}}\right\rfloor,$$

and a symbol in which the nominal repetition ends in the last slot may be given by $$\mathrm{mod}\left(S+(n+1)\cdot L-1,\ N_{symb}^{slot}\right).$$

Herein, n is equal to 0, . . . , numberofrepetitions-1 (n=0, . . . , numberofrepetitions-1), S may denote the configured starting symbol of the uplink data channel, and L may denote the configured symbol length of the uplink data channel. $K_s$ may indicate a slot in which the PUSCH transmission starts, and $$N_{symb}^{slot}$$

may indicate the number of symbols per slot.

The terminal may determine an invalid symbol for PUSCH repetition type B. A symbol configured as downlink by tdd-UL-DL-ConfigurationCommon or tdd-UL-DL-ConfigurationDedicated may be determined as an invalid symbol for PUSCH repetition type B. Additionally, an invalid symbol may be configured based on a higher layer parameter (e.g., InvalidSymbolPattern). For example, an invalid symbol may be configured by the higher layer parameter (e.g., InvalidSymbolPattern) providing a symbol level bitmap over one slot or two slots. What is indicated by 1 in the bitmap may indicate an invalid symbol. Additionally, the period and the pattern of the bitmap may be configured through a higher layer parameter (e.g., periodicityAndPattern). In a case where a higher layer parameter (e.g., InvalidSymbolPattern) is configured, if the parameter InvalidSymbolPatternIndicator-ForDCI-Format0_1 or InvalidSymbolPatternIndicator-ForDCI-Format0_2 indicates 1, the terminal may apply an invalid symbol pattern, and if same indicates 0, the terminal may not apply an invalid symbol pattern. Alternatively, if a higher layer parameter (e.g., InvalidSymbolPattern) is configured, and the parameter InvalidSymbolPatternIndicator-ForDCIFormat0_1 or InvalidSymbolPatternIndicator-ForDCIFormat0_2 is not configured, the terminal may apply an invalid symbol pattern.

After an invalid symbol is determined in each nominal repetition, the terminal may consider, as valid symbols, symbols other than the determined invalid symbol. If one or more valid symbols are included in each nominal repetition, the nominal repetition may include one or more actual repetitions. Each actual repetition may indicate a symbol actually used for PUSCH repetition among symbols configured as the configured nominal repetition, and may include a consecutive set of valid symbols available for PUSCH repetition type B in one slot. The terminal may omit actual repetition transmission when an actual repetition having one symbol is configured to be valid, except for a case where the configured symbol length (L) of the uplink data channel is equal to 1 (L=1). A redundancy version may be applied according to a redundancy version pattern configured for each n-th actual repetition.

Figure 6:
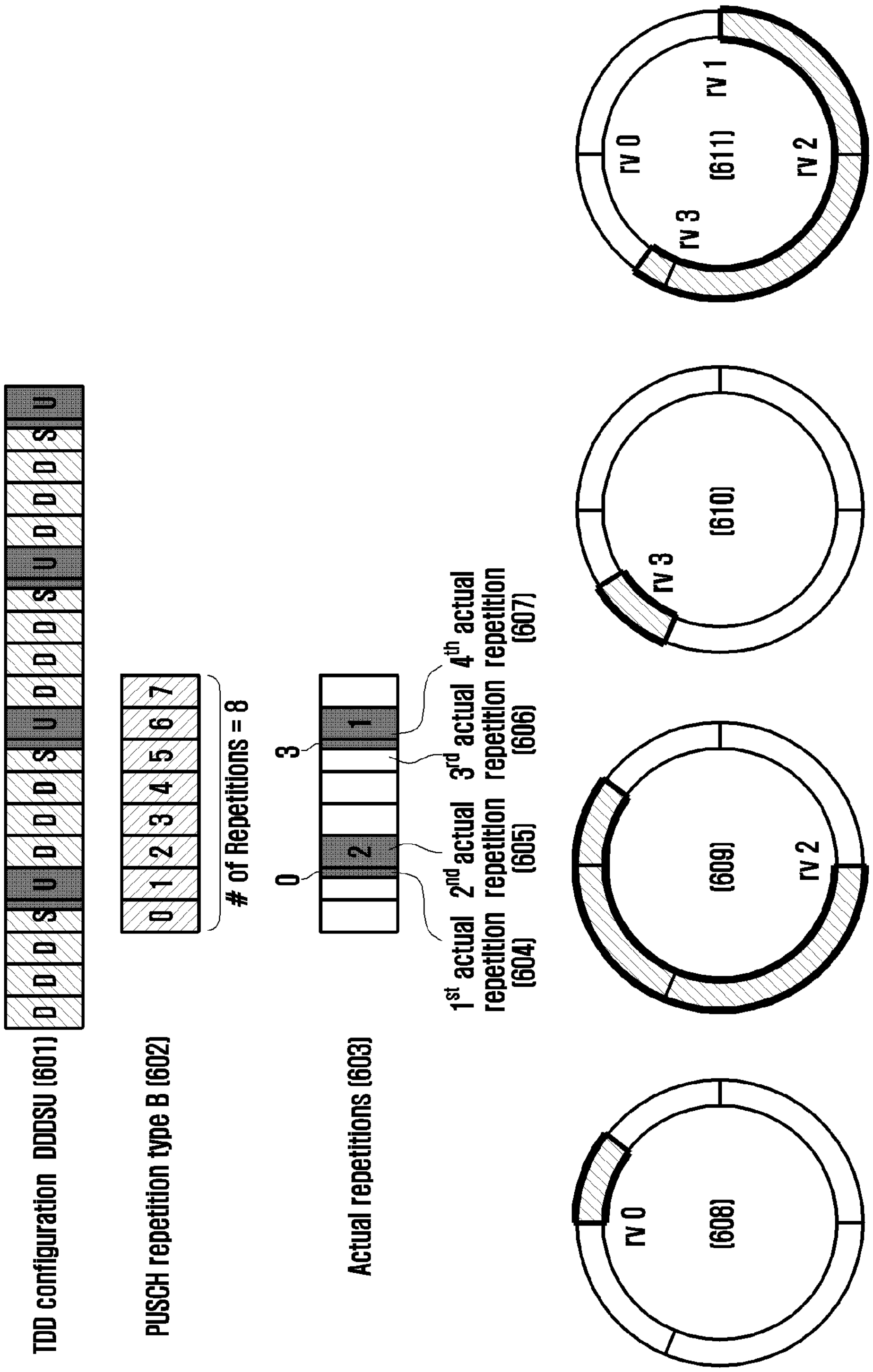
FIG. 6 is a diagram illustrating an example of PUSCH repetition type B in a 5G system.

FIG. 6 is a diagram illustrating an example of PUSCH repetition type B in a 5G system.

A terminal may have a frame structure configuration of time division duplexing (TDD) configured to include three downlink slots, one special/flexible slot, and one uplink slot. When the special/flexible slot is configured to have, for example, 11 downlink symbols and 3 uplink symbols, an initial transmission slot in a second uplink transmission is the third slot, and when, for the terminal, the index of the starting symbol of an uplink data channel is configured as 0 and the symbol length of the uplink data channel is configured as 14, and a repetition count is 8 (repK=8), nominal repetitions may appear in 8 consecutive slots from the initial transmission slot (as indicated by reference numeral 602). Thereafter, the terminal may determine, as an invalid symbol in each nominal repetition, a symbol configured as a downlink symbol in a frame structure 601 of a TDD system, and when valid symbols are configured as one or more consecutive symbols in one slot, the valid symbols may be configured and transmitted as an actual repetition (as indicated by reference numeral 603). Accordingly, a total of 4 PUSCHs (repK_actual=4) may be actually transmitted. When repK-RV is configured as 0-2-3-1, a redundancy version (RV) in a PUSCH of an actually transmitted first resource 604 is 0, an RV in a PUSCH of an actually transmitted second resource 605 is 2, an RV in a PUSCH of an actually transmitted third resource 606 is 3, and an RV in a PUSCH of an actually transmitted fourth resource 607 is 1. Only PUSCHs having RV 0 and RV 3 are decodable themselves. However, in each of the first resource 604 and the third resource 606, the PUSCH is transmitted only in three symbols smaller than the actually configured symbol length (14 symbols), and thus a rate-matched bit length 608 or 610 is smaller than a bit length 609 or 611.

Hereinafter, a method for determining an uplink available slot for single or multi-PUSCH transmission in a 5G system will be described in detail. In order to determine an available slot, if at least one symbol configured through TDRA for a PUSCH in a slot for PUSCH transmission overlaps with a symbol for a purpose different from uplink transmission, the slot may be determined as an unavailable slot. In addition, an available slot may be considered as a resource for PUSCH transmission and an uplink resource for determining a TBS, in a PUSCH repetition and a multi-slot PUSCH transmission configured by one TB (this transmission may be called as TB processing over multi-slot PUSCH, or TBoMS hereinafter).

Figure 7:
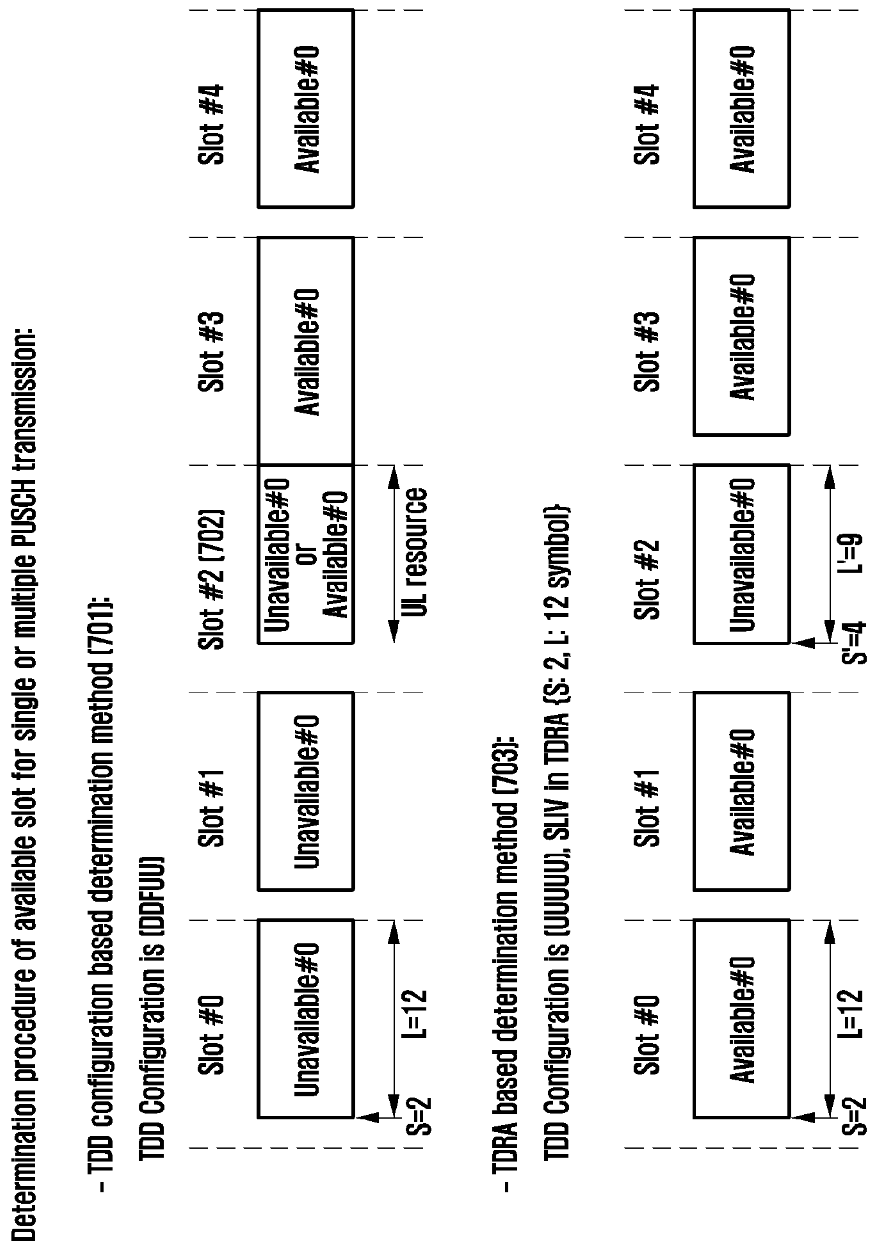
FIG. 7 is a diagram illustrating a method for determining an available slot in a 5G system.

FIG. 7 is a diagram illustrating a method for determining an available slot in a 5G system. When a base station configures an uplink resource through higher layer signaling (tdd-UL-DL-ConfigurationCommon or tdd-UL-DL-ConfigurationDedicated) or L1 signaling (dynamic slot format indicator), the base station and a terminal may determine, for the configured uplink resource, an available slot through 1) an available slot determination method based on a TDD configuration or 2) an available slot determination method considering a TDD configuration and time domain resource allocation (TDRA), and a CG configuration or activation DCI.

As an example of an available slot determination method based on a TDD configuration, as illustrated in FIG. 7, if a TDD configuration is configured as "DDFUU" through higher layer signaling, the base station and the terminal may determine slot #3 and slot #4 configured as "U" indicating uplink as available slots, based on the TDD configuration (as indicated by reference numeral 701). Slot #2 configured as "F" indicating a flexible slot, based on the TDD configuration may be determined as an unavailable slot or an available slot, and for example, may be predefined through a base station configuration.

As an example of an available slot determination method considering a TDD configuration and time domain resource allocation (TDRA), and a CG configuration or activation DCI, as illustrated in FIG. 7, if a TDD configuration is configured as "UUUUU" through higher layer signaling and the start and length indicator value (SLIV) of a PUSCH transmission is configured as {S: 2, L: 12 symbol} through L1 signaling, the base station and the terminal may determine, for the configured uplink slots "U", slot #0, slot #1, slot #3, and slot #4 satisfying the SLIV of the PUSCH as available slots. The base station and the terminal may determine, as an unavailable slot, slot #2 ("L=9"≤SLIV "L=12") not satisfying the SLIV that is a TDRA condition for PUSCH transmission (as indicated by reference numeral 703). This is merely for an example and does not limit the scope of the disclosure to PUSCH transmission, and may be also applied to PUCCH transmission, PUSCH/PUCCH repetition, nominal repetition of PUSCH repetition type B, and TBoMS.

Figure 8A:
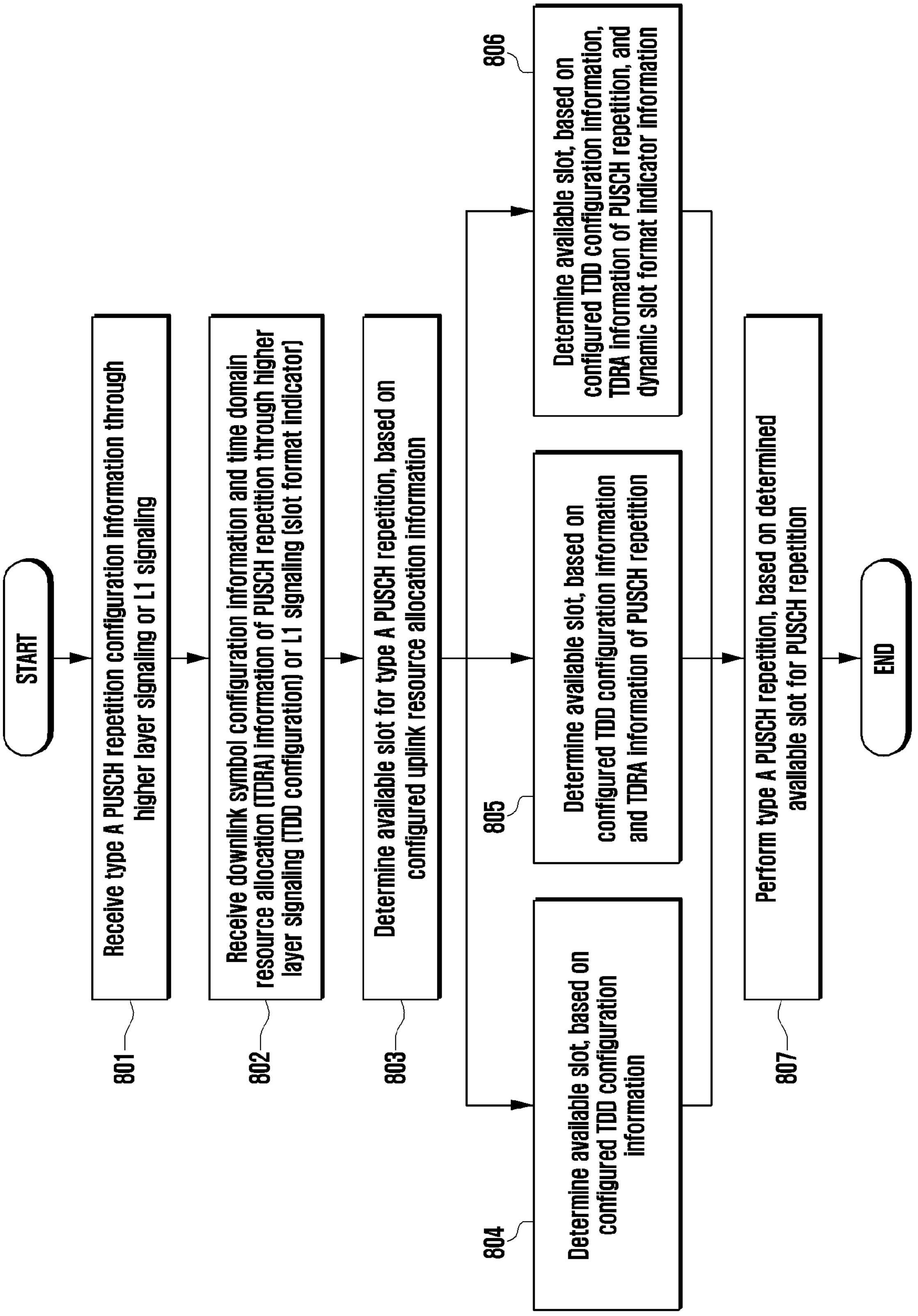
FIG. 8A is a flowchart illustrating an operation of a terminal for type A PUSCH repetition in a 5G system.
Figure 8B:
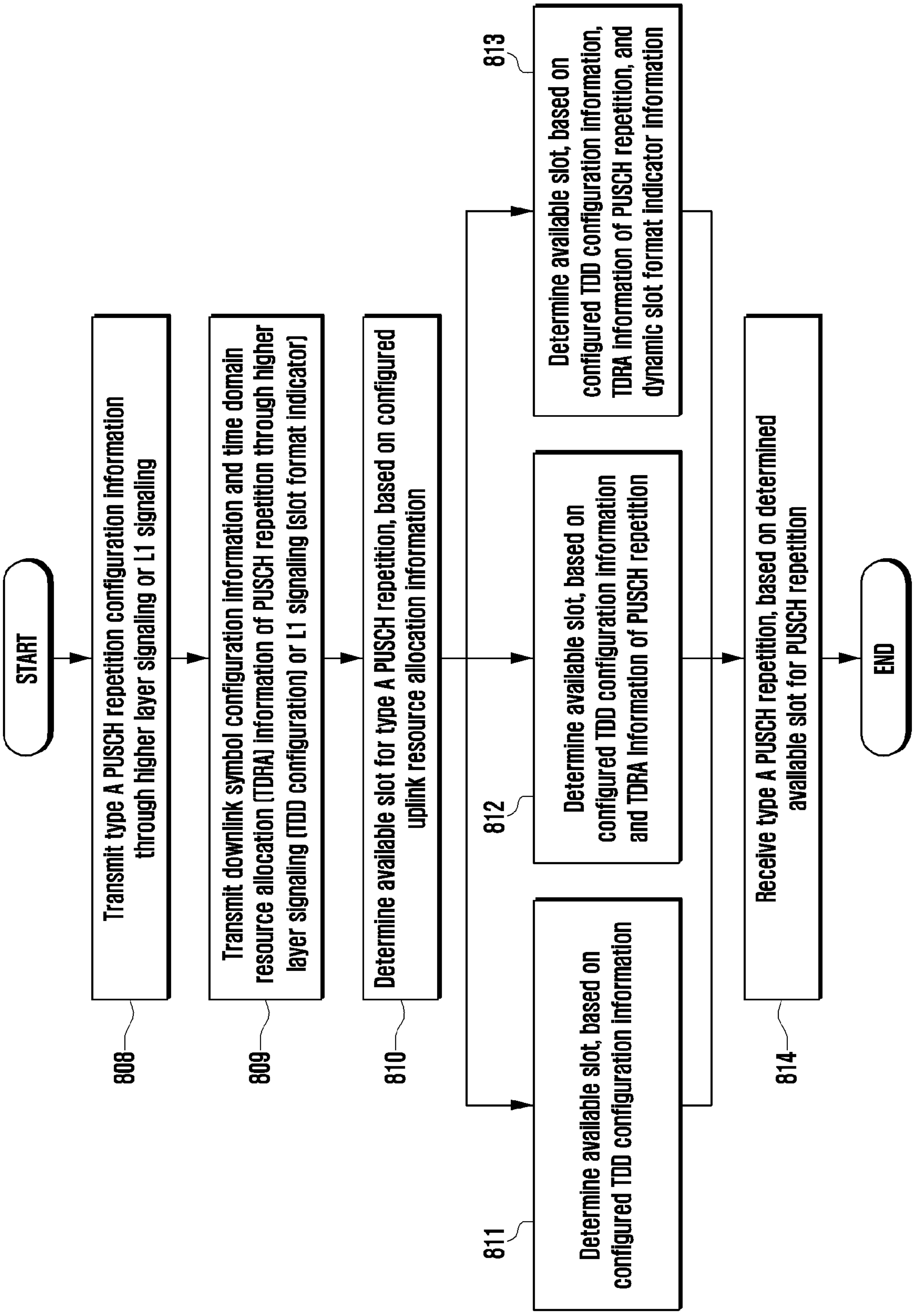
FIG. 8B is a flowchart illustrating an operation of a base station for type A PUSCH repetition in a 5G system.

FIG. 8A and FIG. 8B are flowcharts illustrating operations of a terminal and a base station for type A PUSCH repetition in a 5G system.

With reference to FIG. 8A, an operation of a terminal for type A PUSCH repetition is described. A terminal may receive, from a base station, configuration information for type A PUSCH repetition through higher layer signaling or L1 signaling (operation 801).

In addition, the terminal may receive downlink symbol configuration information and time domain resource allocation (TDRA) information of PUSCH repetition through higher layer signaling (TDD configuration, or tdd-UL-DL-ConfigurationCommon or tdd-UL-DL-ConfigurationDedicated) or L1 signaling (slot format indicator) (operation 802).

Thereafter, the terminal may determine an available slot for type A PUSCH repetition, based on uplink resource allocation information configured by the base station (operation 803). The terminal may determine an available slot by using one of three methods 804, 805, and 806 or a combination of one or more thereof. In the first method, the terminal may determine, as an available slot, only a slot configured as uplink, based on the configured TDD configuration information (operation 804). In the second method, the terminal may determine an available slot by considering the configured TDD configuration information and TDRA information for PUSCH transmission, a CG-configuration, and activation DCI (operation 805). Lastly, the terminal may determine an available slot by considering the configured TDD configuration information and TDRA information for PUSCH transmission, the CG-configuration, the activation DCI information, and a dynamic slot format indicator (SFI) (operation 806). A method used for determining the available slot may be predefined/promised between the base station and the terminal, or may be semi-statically or dynamically configured and indicated through signaling between the base station and the terminal.

Thereafter the terminal may perform type A PUSCH repetition to the base station through the determined available slot (operation 807).

With reference to FIG. 8B, an operation of a base station for configuring type A PUSCH repetition for a terminal is described.

A base station may transmit, to a terminal, configuration information for type A PUSCH repetition through higher layer signaling or L1 signaling (operation 808).

In addition, the base station may configure and transmit downlink symbol configuration information and time domain resource allocation (TDRA) information of PUSCH repetition through higher layer signaling (TDD configuration, or tdd-UL-DL-ConfigurationCommon or tdd-UL-DL-ConfigurationDedicated) or L1 signaling (slot format indicator) (operation 809). Thereafter, the base station may determine, for the terminal, an available slot for type A PUSCH repetition, based on the configured uplink resource allocation information (operation 810).

The base station may determine an available slot by using one of three methods 811, 812, and 813 or a combination of one or more thereof. In the first method, the base station may determine, as an available slot, only a slot configured as uplink, based on the configured TDD configuration information (operation 811). In the second method, the base station may determine an available slot by considering the configured TDD configuration information and TDRA information for PUSCH transmission, a CG-configuration, and activation DCI (operation 812). Lastly, the base station may determine an available slot by considering the configured TDD configuration information and TDRA information for PUSCH transmission, the CG-configuration, the activation DCI information, and a dynamic slot format indicator (SFI) (operation 813). A method used for determining the available slot may be predefined/promised between the base station and the terminal, or may be semi-statically or dynamically configured and indicated through signaling between the base station and the terminal.

Thereafter, the base station may receive type A PUSCH repetition from the terminal through the determined available slot (operation 814).

The above embodiment is merely for an example and does not limit the scope of the disclosure to PUSCH transmission, and may be also applied to PUCCH transmission, PUSCH/PUCCH repetition, nominal repetition of PUSCH repetition type B, and TBoMS.

In the disclosure, a method for improving the coverage performance of a 5G communication system is proposed. More specifically, a method of configuring a time domain window (TDW) for performing joint channel estimation for multiple PUSCHs and PUSCH repetition in a 5G system is proposed. A TDW configuration method for joint channel estimation may be applied to multiple PUSCHs and PUSCH repetition according to an embodiment of the disclosure. Accordingly, the performance of channel estimation and uplink coverage may be improved by efficient joint channel estimation for multiple PUSCHs, based on a configured TDW.

An operation method of a terminal for configuring a time domain window (TDW) for performing joint channel estimation for PUSCH transmission, based on multi-PUSCH transmission and PUSCH repetition information, and performing the PUSCH transmission according to an embodiment of the disclosure may include receiving multi-PUSCH transmission/repetition information from a base station, receiving TDW configuration information for performing joint channel estimation from the base station through higher layer signaling and L1 signaling, allocating, based on the configured TDW configuration information, a TDW to actual resources and configuring the same power and a continuous phase for multiple PUSCHs in the TDW, and transmitting the multiple PUSCHs having the same power and the continuous phase, based on the configured TDW.

An operation method of a base station for configuring a TDW for performing joint channel estimation for PUSCH transmission, based on multi-PUSCH transmission and PUSCH repetition information, and performing PUSCH reception according to an embodiment of the disclosure may include transmitting multi-PUSCH transmission/repetition information to a terminal, transmitting TDW configuration information for performing joint channel estimation to the terminal through higher layer signaling and L1 signaling, determining actual resources to which a TDW is allocated, based on the configured TDW configuration information, and receiving multiple PUSCHs having the same power and a continuous phase, based on the configured TDW, and performing joint channel estimation.

According to the disclosure, a method of configuring a TDW for performing joint channel estimation for multi-PUSCH transmission/repetition will be described using an embodiment. Additionally, a method for determining configuration information of a TDW will be described. An embodiment of the disclosure relates to PUSCH transmission and PUSCH repetition, but this is merely for an example and does not limit the scope of the disclosure, and may be applied to PUCCH transmission, PUCCH repetition, and TBoMS transmission. An application of a method of the disclosure may also be applied to slots, which are configured as uplink resources, to have different numbers of PRBs, based on the starting symbol, the symbol length, the number of PRBs, and the number of REs. In addition, an embodiment of the disclosure relating to joint channel estimation of multiple PUSCHs configured by different TBs provides a PUSCH transmission method based on joint channel estimation of PUSCH repetition of multi-PUSCH repetition type A/B. However, this is merely for an example and does not limit the scope of the disclosure. Joint channel estimation may be performed in continuous or discontinuous PUSCH transmission, TBoMS-PUSCH transmission, and TBoMS-TBoMS transmission in which the power consistency and phase continuity of a PUSCH are maintained, and a method of the disclosure may be applied thereto.

A method of configuring a TDW for performing joint channel estimation for multi-PUSCH transmission/repetition according to an embodiment of the disclosure is provided, and the improvement of channel estimation performance caused by efficient joint channel estimation may increase uplink coverage. In the following description of overall embodiments of the disclosure, PUSCH repetition type A/B is present as an example. However, this merely corresponds to an example, and does not limit the scope of the disclosure, and an embodiment of the disclosure may be applied even to PUSCH/PUCCH/PDSCH/PDCCH/physical sidelink shared channel (PSSCH)/physical sidelink control channel (PSCCH) transmission that is predefined/configured or is configured through signaling between a base station and a terminal. In addition, hereinafter, according to an embodiment of the disclosure, a method of using an additional uplink resource (unavailable slot) for PUSCH repetition and multi-PUSCH transmission configured by one TB, and a configuration method for performing joint channel estimation for multi-PUSCH transmission configured by different TBs may be predefined/configured or be configured through signaling between a base station and a terminal. A random value included in the configured information may be configured as one or a combination of a symbol/slot length, continuity of PUSCH transmission and the interval between PUSCH transmissions, the number of PUSCH transmissions, a transmission occasion, the number of all REs, and the number of all PRBs.

An embodiment of the disclosure provides a method of determining/configuring a time domain window (TDW) for performing joint channel estimation for multi-PUSCH transmission/repetition and performing joint channel estimation using the configured time domain window. More specifically, the TDW may mean a period for which joint channel estimation is performed, and the power consistency and phase continuity of PUSCH transmission may be maintained for the configured TDW for joint channel estimation. In order to maintain the power consistency and the phase continuity, based on the configured TDW, configuration of the same precoder, the same transmission power and phase, the same RBs, and the same MCS is required, and DL transmission/reception and monitoring is not allowed between PUSCHs/PUCCHs in which joint channel estimation is performed. In addition, the TDW is unable to be configured to exceed a maximum duration (max duration) for which a terminal is able to maintain power consistency and phase continuity, and may be determined to be equal to or smaller than the max duration. The max duration may be determined as a capability of a particular terminal, and may be reported to a base station through higher layer signaling and L1 signaling. In the disclosure, PUSCH transmission is described as an example, but this is for convenience of description, and a method described in the disclosure may also be applied to PUCCH/PDSCH/PDCCH/PSSCH/PSCCH transmission. In addition, the method may be applied to type B PUSCH repetition based on nominal repetition/actual repetition.

Figure 9A:
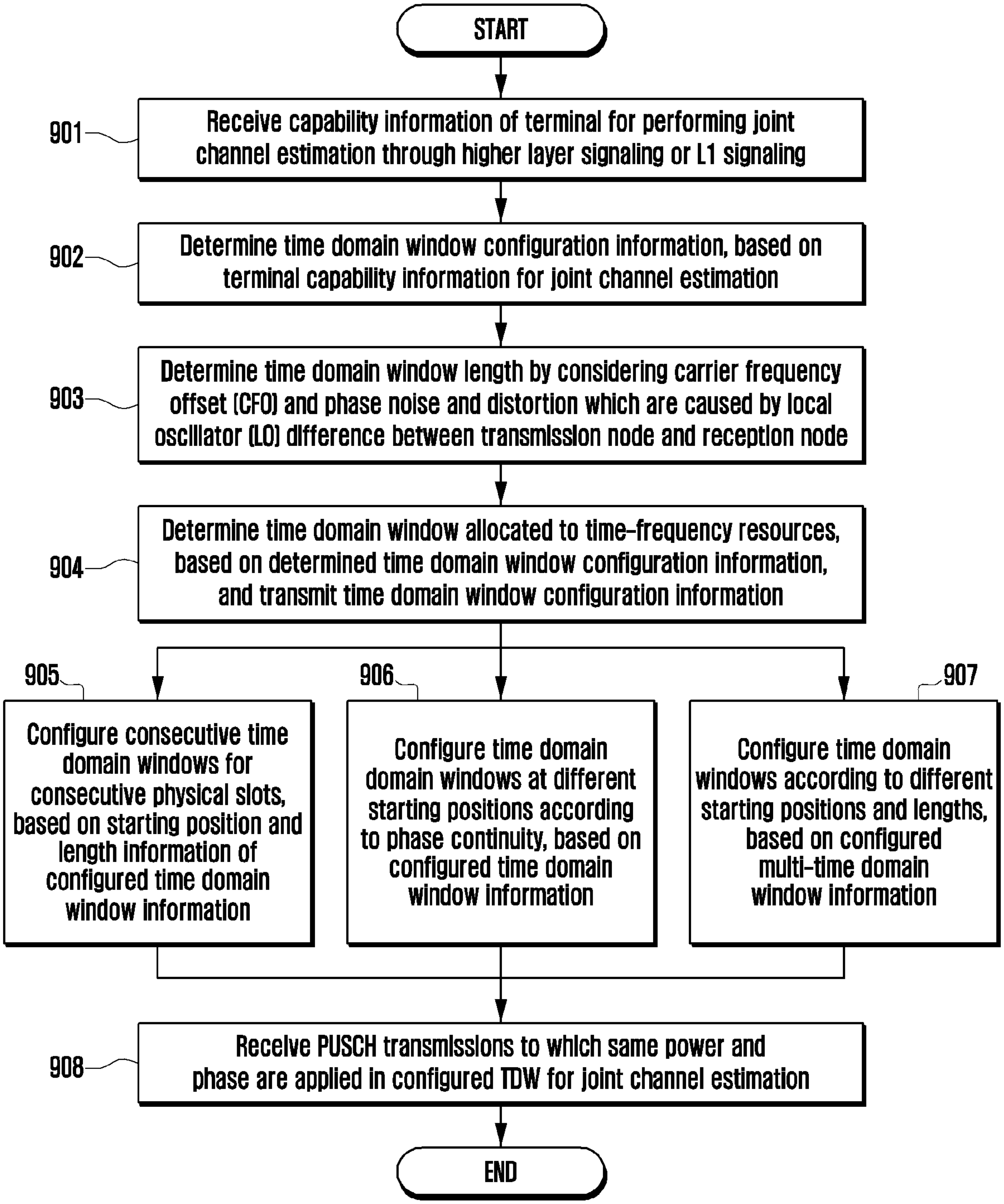
FIG. 9A is a flowchart illustrating an operation of a base station that configures a time domain window (TDW) for performing joint channel estimation in a 5G system and performs joint channel estimation.
Figure 9B:
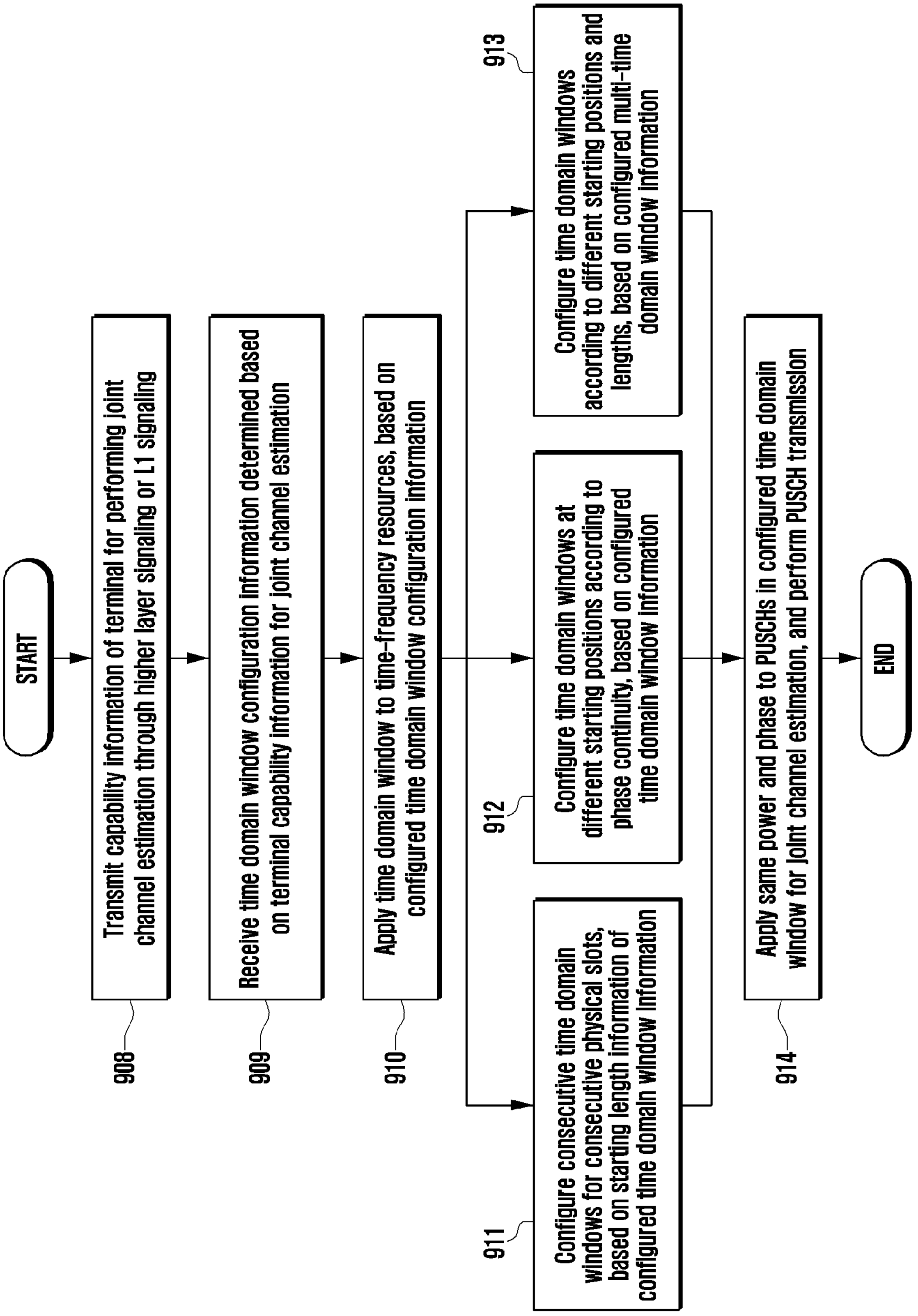
FIG. 9B is a flowchart illustrating an operation of a terminal that configures a time domain window (TDW) for performing joint channel estimation in a 5G system and performs joint channel estimation.

FIG. 9A and FIG. 9B are flowcharts illustrating operations of a base station and a terminal that configure a TDW for performing joint channel estimation for multi-PUSCH transmission/repetition in a 5G system, and perform joint channel estimation, based on the configured TDW.

Referring to FIG. 9A, a base station may receive capability information (e.g., max duration) of a terminal for performing joint channel estimation from the terminal through higher layer signaling or L1 signaling (operation 901). The base station may determine a maximally configurable range and unit of a TDW, based on the max duration that is the configured capability information of the terminal. The max duration configured by the terminal may be configured in a time unit (e.g., ms), a symbol unit, or a slot unit. The base station may configure, as the TDW, symbols, slots, the number of repetitions, and the number of actual/nominal repetitions according to a PUSCH transmission for joint channel estimation or a PUSCH repetition type. The base station may perform conversion by using one or a combination of the following methods as a method of converting the configured max duration to TDW configuration information for configuring joint channel estimation (operation 902).

[Method 1-1]

In method 1-1, a method of converting a max duration configured as a capability of the terminal into a slot-based TDW is described.

When "X ms" based on a time unit or "X symbols" based on a symbol unit is configured as a max duration for the base station by the terminal through higher layer signaling and L1 signaling, the base station may configure a maximally configurable number of slots of a slot-based TDW as X×(μ+1) (μ:subcarrierSpacing), based on "X" configured in a time unit. Meanwhile, if a symbol-based max duration is configured, the base station may configure a maximally configurable number of slots of a slot-based TDW as $$\left\lfloor \frac{X}{14} \right\rfloor,$$

based on "X symbols" configured in a symbol unit. When the max duration is converted through the method to be suitable for a slot unit, which is a framework unit provided as a basis in a 5G system, and the converted max duration is used in a TDW unit for configuration, the complexity of implementation of a base station and a terminal for joint channel estimation may be lowered.

[Method 1-2]

In method 1-2, a method of converting a max duration configured as a capability of the terminal into a slot-based TDW is described. When "X ms" based on a time unit or "X slots" based on a slot unit is configured as a max duration for the base station by the terminal through higher layer signaling and L1 signaling, the base station may configure a maximally configurable number of symbols of a slot-based TDW as 14×X×(μ+1)(μ:subcarrierSpacing), based on "X" configured in a time unit. In addition, the base station may configure a maximally configurable number of symbols of a slot-based TDW as 14×X, based on "X" configured in a time unit. Through the method, TDW configuration in a symbol unit is supported and thus more efficient TDW configuration is possible, and may be usefully applied to PUSCH transmission type B having a TDRA in a symbol unit.

[Method 1-3]

In method 1-3, a method of converting a max duration configured as a capability of the terminal into a PUSCH repetition count-based TDW is described. When "X ms" based on a time unit or "X slots" based on a slot unit is configured as a max duration for the base station by the terminal through higher layer signaling and L1 signaling, and a PUSCH repetition is configured, the base station may determine a maximally configurable count of a PUSCH repetition count-based TDW, based on a PUSCH repetition type. When a max duration and PUSCH repetition type A are configured for the base station through higher layer signaling and L1 signaling, the base station may determine a configurable maximum TDW value as $$\left\lfloor \frac{\text{“}X\text{ symbols” or “}14 \times X \times (\mu + 1)\text{”}}{L_{PUSCH}} \right\rfloor \text{(the configured } PUSCH \text{ length ‘}L\text{’)}$$

by using the max duration. In addition, when a max duration and PUSCH repetition type B are configured for the base station through higher layer signaling and L1 signaling, the base station may determine a configurable maximum TDW value as $$\left\lfloor \frac{\text{“}X\text{ symbols” or “}14 \times X \times (\mu + 1)\text{”}}{L_{Nominal}} \right\rfloor \text{(the nominal repetition length ‘}L_{Nominal}\text{’)}$$

by using the max duration. When TDW configuration in a PUSCH repetition count unit is supported through the method, efficient TDW configuration is possible according to a PUSCH transmission type.

Through method 1-1 to method 1-3 of the disclosure, the base station may determine a TDW value that is maximally configurable for the terminal. Thereafter, the base station may configure a time domain window by considering a carrier frequency offset (CFO) and phase noise and distortion which are caused by a local oscillator (LO) difference and a hardware error between a transmission node of the terminal and a reception node of the base station (operation 903). The base station may configure a TDW by comparing a value relating to the carrier frequency offset (CFO), the phase noise and distortion, and amplitude degradation with threshold "T" predefined as each of CFO, noise, and distortion for joint channel estimation in view of implementation. For example, when the base station operates at a 4 GHz carrier frequency, if the measured CFO value is an offset value of 400 Hz corresponding 0.1 ppm, two slots may be configured as a minimum TDW. If the measured CFO value is an offset value of 100 Hz corresponding 0.025 ppm, four slots may be configured as a TDW. If the measured CFO value is higher than the configured threshold "T", joint channel estimation may not be performed. In order to ensure the performance of joint channel estimation through the method, a measured value of a carrier frequency offset (CFO), phase noise and distortion, and amplitude degradation may be used to determine a TDW. Thereafter, the base station may determine a TDW allocated in time-frequency resources, based on the TDW value determined by the above method, and transmit TDW configuration information to the terminal (operation 904). The base station may determine a TDW allocation by using one or a combination of methods 905, 906, and 907 of allocating a TDW to actual resources according to a mode of TDW configuration information configured through higher layer signaling and L1 signaling.

[Method 2-1]

Method 2-1 describes a method of allocating a TDW to consecutive physical resources. For example, when the base station configures a consecutive mode as a resource allocation mode of TDW configuration information through higher layer signaling and L1 signaling, and when a unit, a starting position, and length information of the TDW are configured by the configuration information of the TDW, the base station may continuously map the TDW to consecutive physical slots from the starting position of the TDW based on the TDW length in the configured TDW unit (operation 905). The implementation complexity of the terminal and the base station may be improved through the method so as to implement joint channel estimation.

[Method 2-2]

Method 2-2 describes a TDW resource allocation method considering discontinuous resource allocation or phase discontinuity. In a case where the base station configures a nonconsecutive mode as a TDW resource allocation mode of TDW configuration information through higher layer signaling and L1 signaling, and a unit, a starting position, and length information of the TDW are configured as the configuration information of the TDW, when the base station determines the starting position of the TDW, the base station may configure the starting position of the TDW by considering the phase continuity of multi-PUSCH transmission for joint channel estimation. For example, the base station may continuously map the TDW to consecutive physical slots from the starting position of the TDW and based on the TDW length in the configured TDW unit as in the consecutive resource allocation mode (operation 905). If phase discontinuity is caused by nonconsecutive resource allocation of multiple PUSCHs for joint channel estimation, the starting position of the TDW may be configured as a starting point of a PUSCH transmission firstly scheduled to be transmitted after the resource in which the discontinuous phase has occurred, and resource allocation of the TDW may be performed based on the configured starting point (operation 906). Through the method, channel estimation may be improved by efficient TDW configuration considering resource discontinuity.

[Method 2-3]

Method 2-3 describes a method of performing resource allocation of a TDW, based on multi-TDW configuration information. Multi-TDW configuration information may be configured for the base station through higher layer signaling or L1 signaling. The configured multi-TDW configuration information may configure several pieces of position information "K2" of the starting slot of a TDW (e.g., TDW #0): {K2, S: 2, L: 20 symbol} and TDW #1: {Ks', S: 2, L: 20 symbol}). Alternatively, the multi-TDW configuration information may be configured for multiple TDWs configured by different SLIVs (e.g., TDW #0): {K2, S: 2, L: 20 symbol} and TDW #1: {Ks', S: 5, L: 28 symbol}). In addition, when PUSCH repetition type A is configured through higher layer signaling and L1 signaling, multiple TDWs are configured, and resource allocation of the TDWs is performed according to PUSCH repetition type A, the TDWs may transmit the multi-TDW configuration information by considering available slots. Therefore, TDW resource allocation may be applied according to a more efficient PUSCH transmission method, based on the configured multi-TDW configuration information (operation 907). In the method, PUSCH transmission is described as an example, but this is for convenience of description, and a method described in the disclosure may also be applied to a PUCCH and PUSCH repetition type B. Thereafter, the base station may receive PUSCH transmissions having the same power and a consecutive phase in the configured TDW for joint channel estimation, and perform a joint channel operation to decode same (operation 908).

Referring to FIG. 9B, a terminal may transmit capability information (e.g., max duration) of the terminal for performing joint channel estimation to a base station through higher layer signaling or L1 signaling (operation 908). The terminal may receive TDW configuration information that is determined by the base station, based on the capability information of the terminal through the procedures 902 and 903 (operation 909). Thereafter, the terminal may perform a TDW allocation by using one or a combination of methods 911, 912, and 913 of allocating a TDW to actual resources according to TDW configuration information configured by the base station through higher layer signaling and L1 signaling (operation 910).

[Method 3-1]

Method 3-1 describes a method of allocating a TDW to consecutive physical resources. For example, when the base station configures a consecutive mode as a resource allocation mode of TDW configuration information through higher layer signaling and L1 signaling, and configures a unit, a starting position, and length information of the TDW as the configuration information of the TDW, the terminal may continuously map the TDW to consecutive physical slots from the starting position of the TDW based on the TDW length in the configured TDW unit (operation 911). The implementation complexity of the terminal and the base station may be improved through the method so as to implement joint channel estimation.

[Method 3-2]

Method 3-2 describes a TDW resource allocation method considering discontinuous resource allocation or phase discontinuity. In a case where a nonconsecutive mode is configured, as a TDW resource allocation mode of TDW configuration information, by the base station for the terminal through higher layer signaling and L1 signaling, and a unit, a starting position, and length information of the TDW are configured as the configuration information of the TDW, when the terminal determines the starting position of the TDW, the terminal may configure the starting position of the TDW by considering the phase continuity of multi-PUSCH transmission for joint channel estimation. For example, the terminal may continuously map the TDW to consecutive physical slots from the starting position of the TDW and based on the TDW length in the configured TDW unit as in the consecutive resource allocation mode (operation 911). If phase discontinuity is caused by nonconsecutive resource allocation of multiple PUSCHs for joint channel estimation, the terminal may configure, as the starting position of the TDW, a starting point of a PUSCH transmission firstly scheduled to be transmitted after the resource in which the discontinuous phase has occurred, and resource allocation of the TDW may be performed based on the configured starting point (operation 912). Through the method, channel estimation may be improved by efficient TDW configuration considering resource discontinuity.

[Method 3-3]

Method 3-3 describes a method of performing resource allocation of a TDW, based on multi-TDW configuration information. Multi-TDW configuration information may be configured for the terminal by the base station through higher layer signaling or L1 signaling. The configured multi-TDW configuration information may configure several pieces of position information "K2" of the starting slot of a TDW (e.g., TDW #0): {K2, S: 2, L: 20 symbol} and TDW #1: {Ks', S: 2, L: 20 symbol}). Alternatively, the multi-TDW configuration information may be configured for multiple TDWs configured by different SLIVs (e.g., TDW #0): {K2, S: 2, L: 20 symbol} and TDW #1: {Ks', S: 5, L: 28 symbol}). In addition, when PUSCH repetition type A is configured through higher layer signaling and L1 signaling, multiple TDWs are configured, and resource allocation of the TDWs is performed according to PUSCH repetition type A, the TDWs may transmit the multi-TDW configuration information by considering available slots. Therefore, TDW resource allocation may be applied according to a more efficient PUSCH transmission method, based on the configured multi-TDW configuration information (operation 913). In the method, PUSCH transmission is described as an example, but this is for convenience of description, and a method described in the disclosure may also be applied to a PUCCH and PUSCH repetition type B. Thereafter, the terminal may perform PUSCH transmissions having the same power and a consecutive phase in the configured TDW for joint channel estimation (operation 914).

Figure 10:
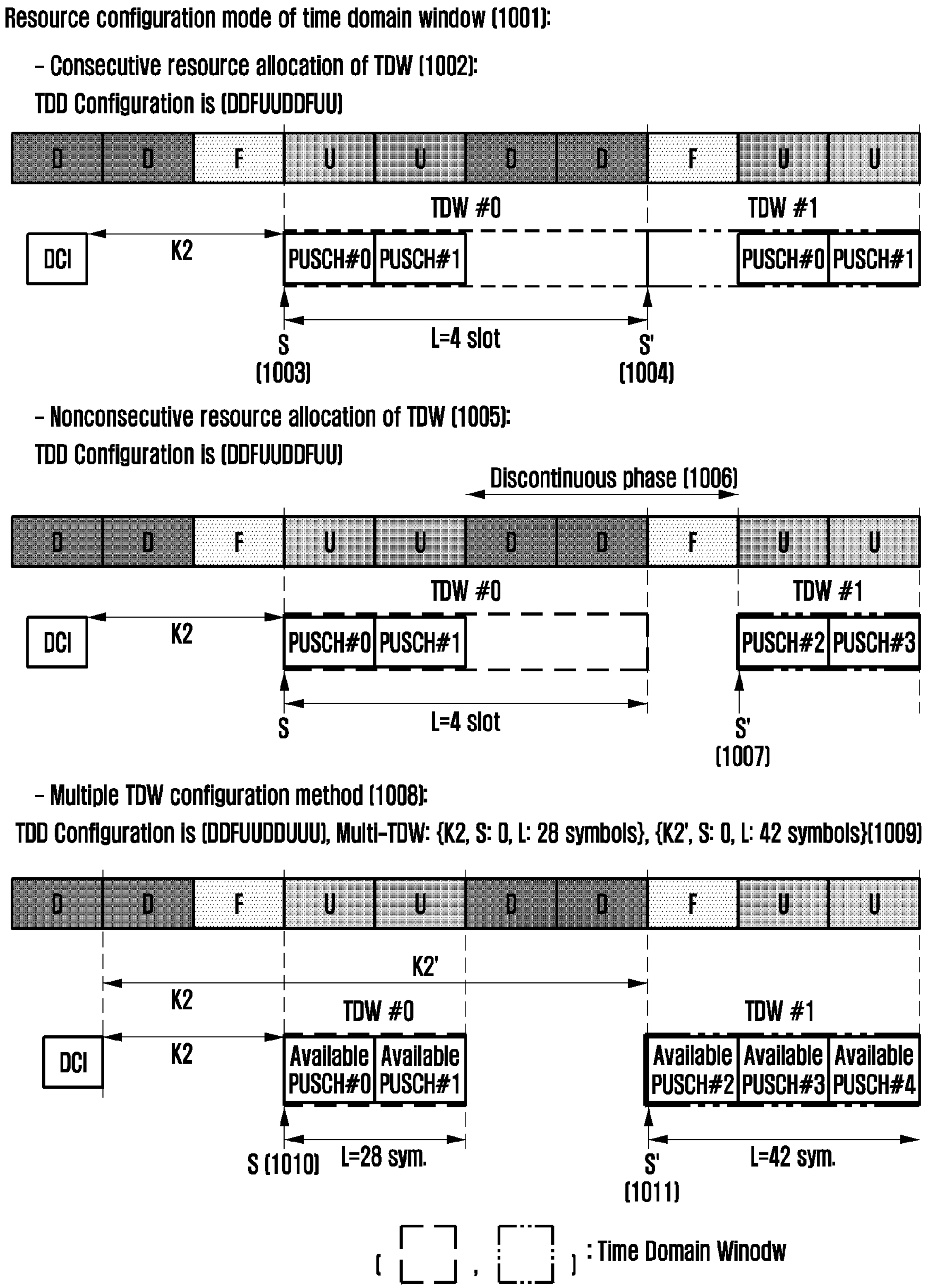
FIG. 10 is a diagram illustrating a method of resource allocation of a time domain window (TDW) according to TDW configuration information in a 5G system.

FIG. 10 is a diagram illustrating a method of resource allocation of a time domain window (TDW) according to TDW configuration information in a 5G system.

Referring to FIG. 10, a TDW method following the methods 905, 906, 907, 911, 912, and 913 of the flowcharts of a base station and a terminal for joint channel estimation is illustrated. The following described method is given based on a terminal, and the same method may be applied to a base station.

Referring to FIG. 10, a method of continuously configuring TDWs in consecutive physical slots by a terminal is proposed (as indicated by reference numeral 1002). When TDW configuration information for joint channel estimation and PUSCH repetition are configured for the terminal by a base station through higher layer signaling and L1 signaling, the terminal may allocate a TDW to resources, based on the configured TDW configuration information (as indicated by reference numeral 1001). When TDW configuration information for joint channel estimation (e.g., {K2, S: 0, L: 4 slots or 56 symbols} and consecutive physical resource allocation mode), configuration information for PUSCH repetition (e.g., {K2, S: 0, L: 14 symbols, repeK: 4}), and a TDD configuration (e.g., DDFUUDDFUU) are configured for the terminal by the base station through higher layer signaling and L1 signaling, the terminal may continuously determine TDW #0 and TDW #1 for consecutive physical slots, based on the configured TDW configuration information, TDW #0) is allocated to consecutive physical slots (e.g., "UUDD"), based on the configured TDW configuration information (e.g., {K2, S: 0, L: 4 slots or 56 symbols}), and the starting position of TDW #1 may be S' 1004. Thereafter, the terminal may configure PUSCH repetitions (e.g., TDW #0: {PUSCH #0, PUSCH #1}, TDW #1: {PUSCH #2, PUSCH #3}) in each TDW to have the same power and a continuous phase, and transmit same (as indicated by reference numeral 1002).

Referring to FIG. 10, a method of configuring a TDW by a terminal by considering the discontinuity of PUSCH resources to which joint channel estimation is applied, and the phase discontinuity thereof is proposed (as indicated by reference numeral 1005). When TDW configuration information for joint channel estimation and PUSCH repetition are configured for the terminal by a base station through higher layer signaling and L1 signaling, the terminal may allocate a TDW to resources, based on the configured TDW configuration information (as indicated by reference numeral 1001). When TDW configuration information for joint channel estimation (e.g., {K2, S: 0, L: 4 slots or 56 symbols} and nonconsecutive physical resource allocation mode), configuration information for PUSCH repetition (e.g., {K2, S: 0, L: 14 symbols, repeK: 4}), and a TDD configuration (e.g., DDFUUDDFUU) are configured for the terminal by the base station through higher layer signaling and L1 signaling, the terminal may determine TDW #0 and TDW #1 by considering nonconsecutive physical slots 1006 (or slot resources having a discontinuous phase), based on the configured TDW The starting point S' 1007 of PUSCH #2 scheduled to be configuration information, transmitted soonest after the nonconsecutive physical slots 1006 may be configured as the starting position of TDW #1. The interval between PUSCH transmissions determined to have a discontinuous phase may be determined through higher layer signaling and L1 signaling, or may be determined in advance through a capability of the terminal. Thereafter, the terminal may configure PUSCH repetitions (e.g., TDW #0: {PUSCH #0, PUSCH #1}, TDW #1: {PUSCH #2, PUSCH #3}) in each TDW to have the same power and a continuous phase, and transmit same (as indicated by reference numeral 1005).

Referring to FIG. 10, a method of configuring TDWs by a terminal by using multi-TDW configuration information is proposed (as indicated by reference numeral 1008). When TDW configuration information 1009 for joint channel estimation (e.g., {K2, S: 0, L: 2 slots or 28 symbols} and {K2', S: 0, L: 3 slots or 42 symbols}), configuration information for PUSCH repetition (e.g., {K2, S: 0, L: 14 symbols, repeK: 5}), PUSCH repetition type A, and a TDD configuration (e.g., DDFUUDDUUU) are configured for the terminal by the base station through higher layer signaling and L1 signaling, the terminal may determine "U" of the TDD configuration as an available slot, and perform type A PUSCH repetition for available slots. Multi-TDW configuration information 1009 (e.g., {K2, S: 0, L: 2 slots or 28 symbols} and {K2', S: 0, L: 3 slots or 42 symbols}) may be configured for the terminal by the base station by considering type A PUSCH repetition occasions according to the available slots, and the terminal may determine TDW #0 and TDW #1. The starting position of the resource-allocated TDW #0 may be determined in a "U" slot to which K2 is applied, based on {S: 0, L: 28 symbols} (1010), and the starting position of the resource-allocated TDW #1 may be determined in a "U" slot to which K2' is applied, based on {S: 0, L: 42 symbols} (1011). Thereafter, the terminal may configure PUSCH repetitions (TDW #0: {PUSCH #0, PUSCH #1}, TDW #1: {PUSCH #2, PUSCH #3, PUSCH #4}) in each TDW to have the same power and a continuous phase, and transmit same (as indicated by reference numeral 1008).

Based on the methods of the embodiment, a terminal may configure a TDW for performing joint channel estimation for PUSCH transmission/repetition, and configure, to be maintained, the power consistency and phase continuity of PUSCHs based on the TDW, thereby performing joint channel estimation with more efficient resources. Therefore, channel estimation performance is improved, and thus uplink coverage may be enhanced. An embodiment of the disclosure provides a method of configuring a TDW according to PUSCH repetition type A/B.

Figure 11:
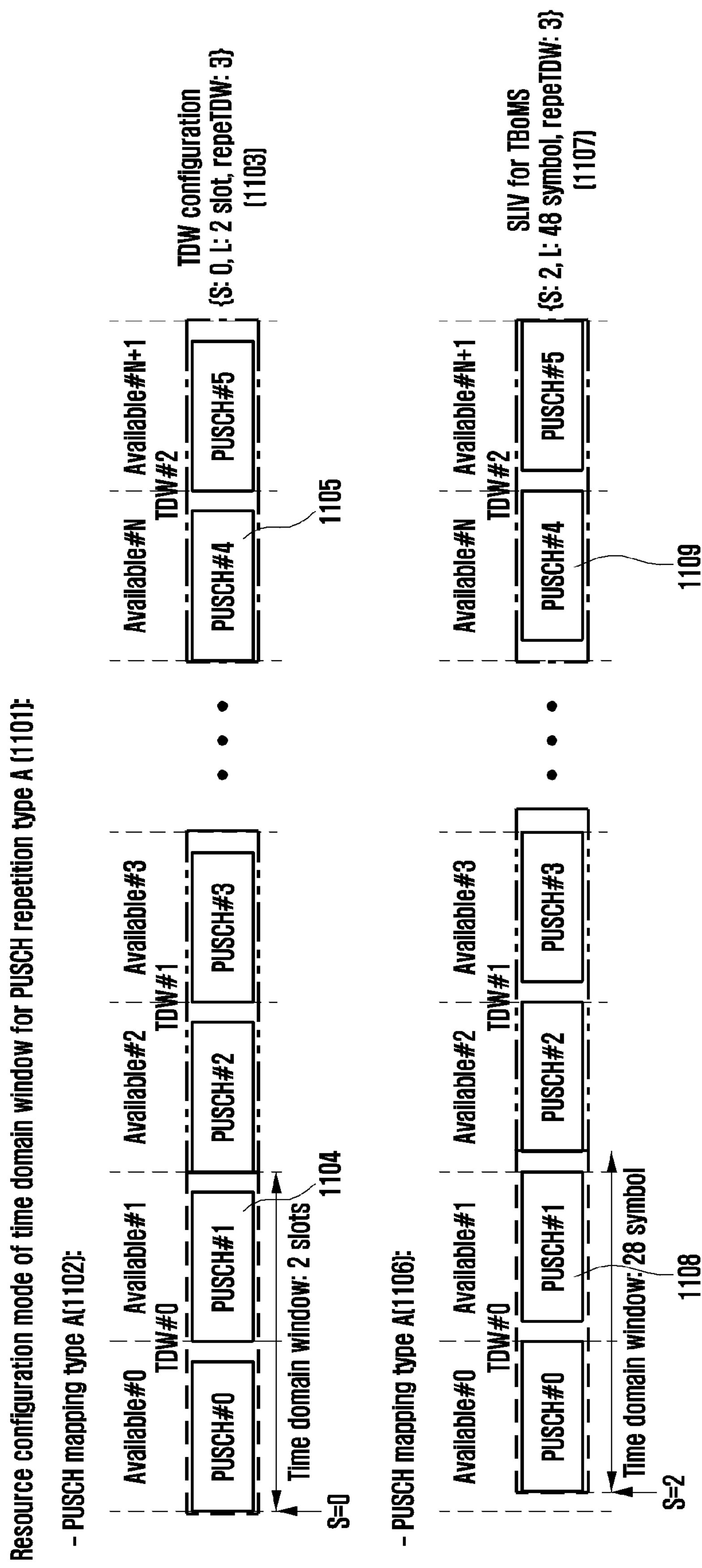
FIG. 11 is a diagram illustrating a TDW configuration method for PUSCH repetition type A in a 5G system.

FIG. 11 is a diagram illustrating a TDW configuration method for PUSCH repetition type A in a 5G system.

Referring to FIG. 11, when {S: 0, L: 12 symbols, repeK: 6, PUSCH mapping type A} (1102) are configured for the terminal by a base station as an example of PUSCH repetition type A and SLIV configuration information through higher layer signaling and L1 signaling, a terminal may transmit PUSCHs #0-#5, based on available slots #0-#3, #N, and #N+1 according to the configured PUSCH repetition type A. If joint channel estimation is enabled for the terminal by the base station through higher layer signaling and L1 signaling, and {K2, S: 0), L: 2 slots, repeTDW: 3, Nonconsecutive mode} (1103) is configured as an example of TDW configuration information, the terminal may configure TDWs #0-#2 for PUSCH repetition. TDW #0 1104 may be configured to include PUSCHs #0 and #1 of PUSCH repetition with respect to S: 0 and L: 2 slots. Thereafter, the terminal may configure TDW #1 to be continuous to the end of available slot #1 at which TDW #0 ends with respect to a consecutive physical slot. Thereafter, the terminal may configure a new TDW #2 1105 at available slot #N that is nonconsecutive. Thereafter, the terminal may configure PUSCH repetitions (e.g., TDW #0: {PUSCH #0, PUSCH #1}, TDW #1: {PUSCH #2, PUSCH #3, PUSCH #4}, TDW #2: {PUSCH #4, PUSCH #5}) in each TDW to have the same power and a continuous phase, and transmit same (as indicated by reference numeral 1102).

In addition, referring to FIG. 11, when an example of {S: 2, L: 12 symbols, repeK: 6, PUSCH mapping type A} (1106) is configured for a terminal by a base station as PUSCH repetition type A and SLIV configuration information through higher layer signaling and L1 signaling, the terminal may transmit PUSCHs #0-#5, based on available slots #0-#3, #N, and #N+1 according to the configured PUSCH repetition type A. If joint channel estimation is enabled for the terminal by the base station through higher layer signaling and L1 signaling, and {K2, S: 2, L: 28 symbols, repeTDW: 3, Nonconsecutive mode} (1107) is configured as TDW configuration information, the terminal may configure TDWs #0-#2 for PUSCH repetition. TDW #0 1108 may be configured to include PUSCHs #0 and #1 of PUSCH repetition with respect to S: 2 and L: 28 symbols. Thereafter, the terminal may configure TDW #1 to be continuous to the end of available slot #1 at which TDW #0 ends with respect to consecutive physical slots. Thereafter, the terminal may configure a new TDW #2 1109 at available slot #N that is nonconsecutive. The terminal may configure PUSCH repetitions (e.g., TDW #0: {PUSCH #0, PUSCH #1}, TDW #1: {PUSCH #2, PUSCH #3, PUSCH #4}, TDW #2: {PUSCH #4, PUSCH #5}) in each TDW to have the same power and a continuous phase, and transmit same (as indicated by reference numeral 1106).

Figure 12:
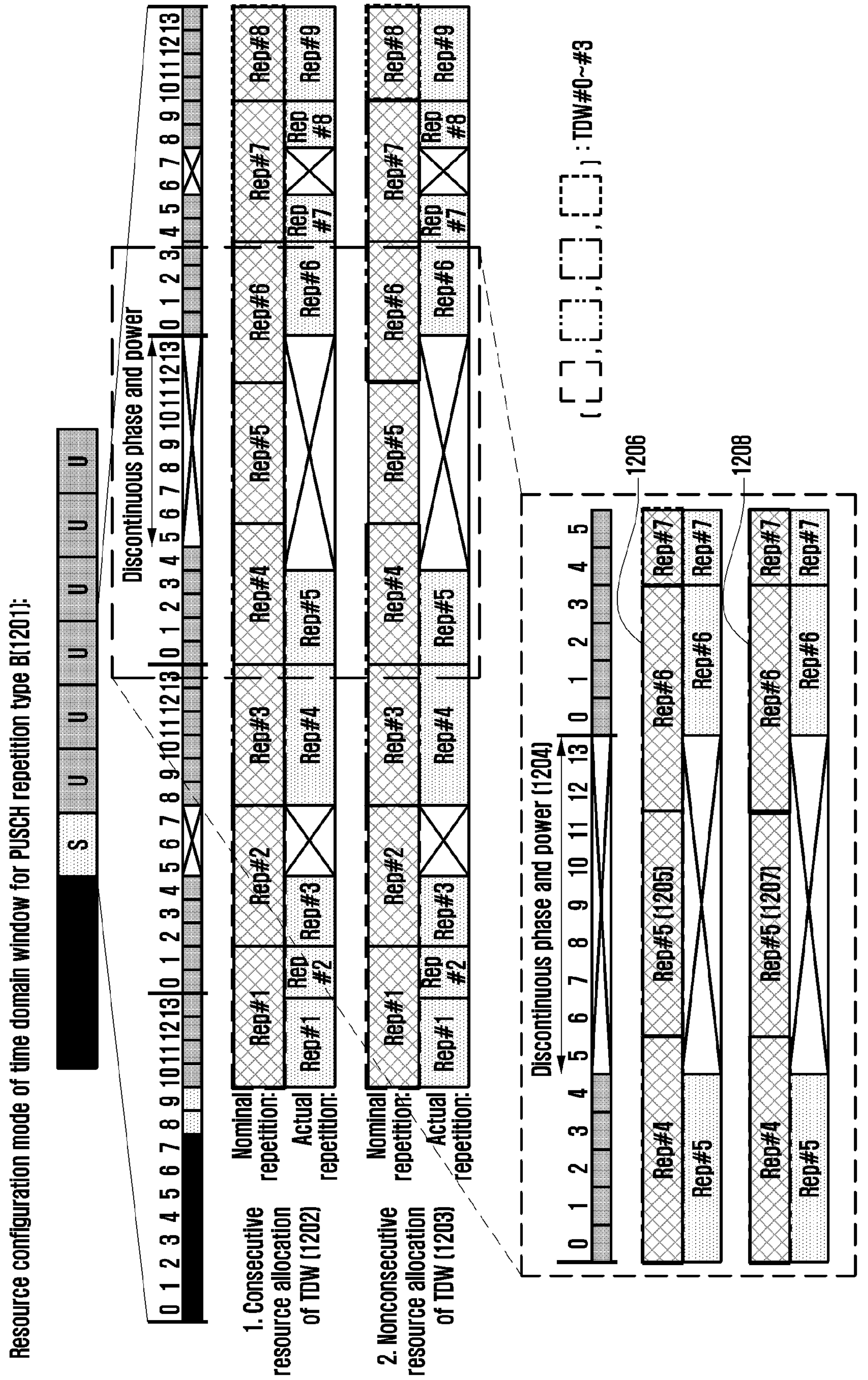
FIG. 12 is a diagram illustrating a TDW configuration method for PUSCH repetition type B in a 5G system.

FIG. 12 is a diagram illustrating a TDW configuration method for PUSCH repetition type B in a 5G system. Referring to FIG. 12, when an example of {S: 10, L: 6 symbols, repeK: 8} (1201) is configured for a terminal by a base station as PUSCH repetition type B and SLIV configuration information through higher layer signaling and L1 signaling, the terminal may transmit actual repetitions #1-#9, based on nominal repetitions #1-#8 according to the configured PUSCH repetition type B. If joint channel estimation is enabled for the terminal by the base station through higher layer signaling and L1 signaling, and an example of {K2, S: 10, L: 2 nominal repetitions, repeTDW: 4, Consecutive mode} (1202) is configured as TDW configuration information, the terminal may configure TDWs #0-#3 for PUSCH repetition. TDW #0 may be configured based on S: 10 and L: 2 nominal repetitions, the configured TDW #0 may be configured to include nominal repetitions #1 and #2, and the same power and a continuous phase for joint channel estimation may be configured for actual repetitions #1-#3. Thereafter, the terminal may configure TDW #1 to be continuous to the end of nominal repetition #2 at which TDW #0 ends, with respect to continuous nominal repetitions. Thereafter, even if there is nominal repetition #5 1205 that is nonconsecutive, TDW #2 1206 may be continuously configured based on consecutive nominal repetitions. The terminal may, based on the configured TDW configuration information, configure a starting slot for a TDW by using $$K_s + \left\lfloor \frac{S + n \times TDW}{N_{symb}^{slot}} \right\rfloor$$

and configure the position of a starting symbol of the TDW in the starting slot by using $$\mathrm{mod}\left(S + n \times TDW,\ N_{symb}^{slot}\right).$$

In addition, the last slot of the TDW may be configured as $$K_s + \left\lfloor \frac{S + (n+1) \times TDW - 1}{N_{symb}^{slot}} \right\rfloor,$$

and the position of a last symbol of the TDW in the last slot may be configured as $$\mathrm{mod}\left(S + (n+1) \times TDW - 1,\ N_{symb}^{slot}\right).$$

In the mathematical expressions, the TDW denotes length information of the TDW, and the configured $$N_{symb}^{slot}$$

denotes the number of symbols per slot. Therefore, the terminal may continuously configure TDWs according to nominal repetitions, based on the mathematical expressions (as indicated by reference numeral 1202). The terminal may configure PUSCH repetitions (e.g., TDW #0: {actual repetitions #1-#3}, TDW #1: {actual repetitions #4 and #5}, TDW #2: {actual repetition #6}, TDW #3: {actual repetitions #7-#9}) in each TDW to have the same power and a continuous phase, and transmit same.

If joint channel estimation is enabled for the terminal by the base station through higher layer signaling and L1 signaling, and an example of {K2, S: 10, L: 2 nominal repetitions, repeTDW: 4, Nonconsecutive mode} (1203) is configured as TDW configuration information, the terminal may configure TDWs #0-#3 for PUSCH repetition. TDW #0 may be configured based on S: 10 and L: 2 nominal repetitions, the configured TDW #0 may be configured to include nominal repetitions #1 and #2, and the same power and a continuous phase for joint channel estimation may be configured for actual repetitions #1-#3. Thereafter, the terminal may configure TDW #1 to be continuous to the end of nominal repetition #2 at which TDW #0 ends, with respect to continuous nominal repetitions. Thereafter, the terminal may configure nominal repetition #6 as the start of TDW #2 by considering nominal repetition #5 1207 that is nonconsecutive, and continuously configure TDW #2 1208 and TDW #3, based on consecutive nominal repetitions #6-#8. That is, when a TDW is configured, the terminal may reconfigure the starting position of the TDW by considering a nonconsecutive slot and nominal repetition. Thereafter, the terminal may, with respect to a consecutive slot and nominal repetition and based on the configured TDW configuration information, configure a starting slot for a TDW by using $$K_s + \left\lfloor \frac{S + n \times TDW}{N_{symb}^{slot}} \right\rfloor$$

and configure the position of a starting symbol of the TDW in the starting slot by using $$\mathrm{mod}\left(S + n \times TDW,\ N_{symb}^{slot}\right).$$

In addition, the last slot of the TDW may be configured as $$K_s + \left\lfloor \frac{S + (n+1) \times TDW - 1}{N_{symb}^{slot}} \right\rfloor,$$

and the position of a last symbol of the TDW in the last slot may be configured as $$\mathrm{mod}\left(S + (n \times 1) \times TDW - 1,\ N_{symb}^{slot}\right).$$

In the mathematical expressions, the TDW denotes length information of the TDW, and the configured $$N_{symb}^{slot}$$

denotes the number of symbols per slot. Therefore, the terminal may configure a starting position of a TDW by considering a nonconsecutive slot and nominal repetition, and then continuously configure the TDW according to the mathematical expressions, based on consecutive slots (as indicated by reference numeral 1203). The terminal may configure PUSCH repetitions (e.g., TDW #0: {actual repetitions #1-#3}, TDW #1: {actual repetitions #4 and #5}, TDW #2: {actual repetitions #6 to #8}, TDW #3: {actual repetition #9}) in each TDW to have the same power and a continuous phase, and transmit same.

Through an embodiment of the disclosure, a terminal may configure a TDW for joint channel estimation with respect to PUSCH transmission/repetition to maintain the power consistency and the phase continuity of PUSCHs for joint channel estimation. Therefore, joint channel estimation is possible and channel estimation performance is improved, and thus uplink coverage may be enhanced.

An embodiment of the disclosure provides a TDW configuration method considering an event, a configured TDW, and an actual TDW in PUSCH repetition.

An embodiment of the disclosure provides a method of determining/configuring a configured-time domain window (TDW) by using an explicit configuration (e.g., RRC configuration or DCI-based configuration) for performing joint channel estimation for multi-PUSCH transmission/repetition. In addition, an embodiment provides a method of determining an actual-time domain window (TDW) for performing actual joint channel estimation within a configured-time domain window, and performing joint channel estimation through the actual-TDW. More specifically, one or more configured-TDWs may be configured for multi-PUSCH transmission and repetition. The configured-TDW may be configured by one or multiple actual-TDWs according to a particular event. The actual-TDW may indicate a period for which joint channel estimation is actually performed, and the event may indicate a state where the power consistency and the phase continuity between two PUSCH transmissions are not maintained. For example, the event may indicate a state where the power consistency and the phase continuity between two PUSCH transmissions are broken, such as DL transmission based on a dynamic SFI, PUSCH drop caused by a cancellation indication (CI), a case where an actual-TDW exceeds a maximum duration, frequency hopping, precoder cycling, overlap with PUSCH transmission with a high priority, a case where DL reception and a DL monitoring occasion are configured, and a case where PUSCH transmission power is distributed by carrier aggregation (CA)/dual connectivity (DC). In an embodiment of the disclosure, a description is given based on PUSCH repetition. However, this is merely for an example and does not limit the scope of the disclosure, and may also be applied to multiple PUSCHs configured by different TBs, TBoMS, type B PUSCH repetition, PUCCH, PSSCH, PSCCH, and Msg3/MsgA PUSCH repetition.

Figure 13A:
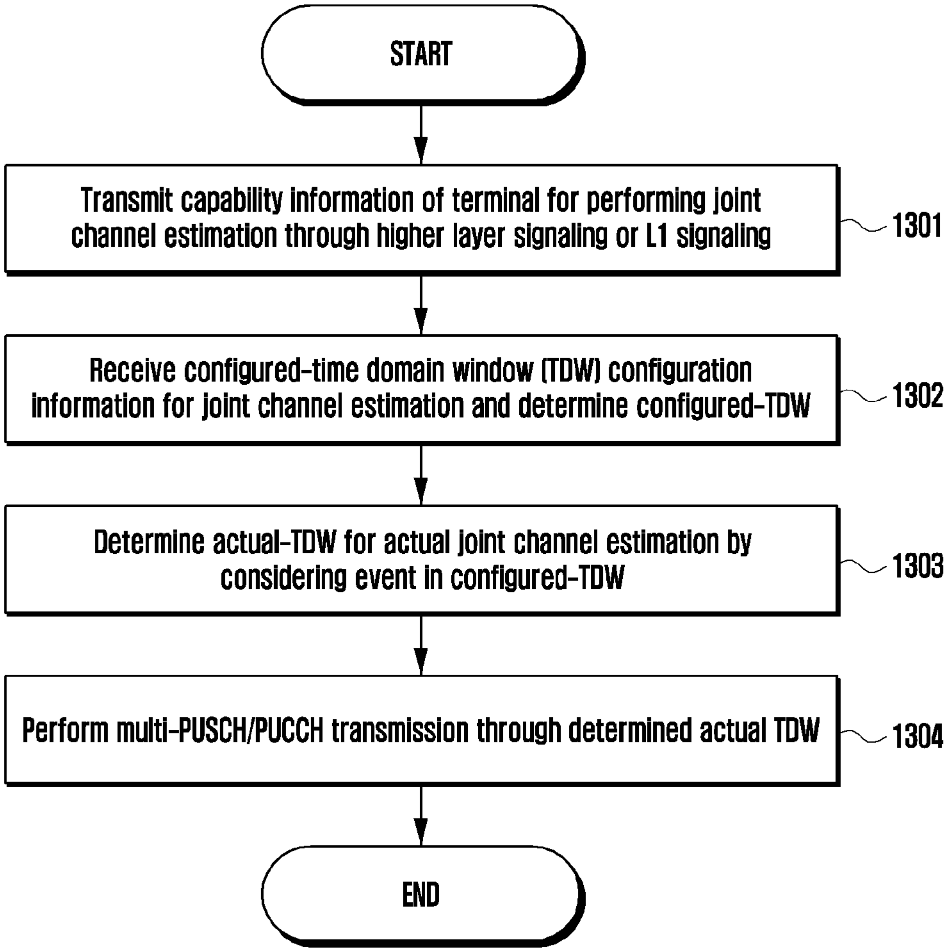
FIG. 13A is a flowchart illustrating an operation of a terminal that determines and configures a time domain window for joint channel estimation in a 5G system.
Figure 13B:
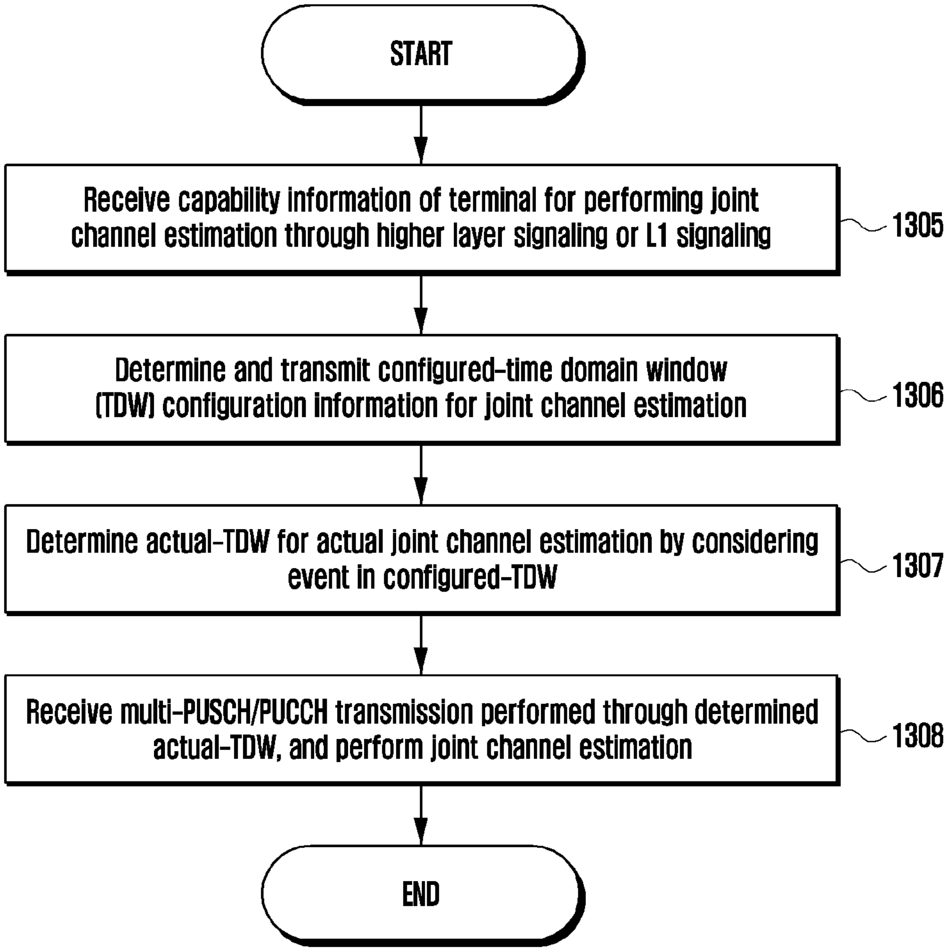
FIG. 13B is a flowchart illustrating an operation of a base station that determines and configures a time domain window for joint channel estimation in a 5G system.

FIG. 13A and FIG. 13B are flowcharts illustrating operations of a terminal and a base station that determine and configure a time domain window for joint channel estimation in a 5G system.

In FIG. 13A, an operation of a terminal that determines and configures a configured-TDW and an actual-TDW for joint channel estimation is illustrated.

A terminal may transmit capability information of the terminal for joint channel estimation to a base station through higher layer signaling or L1 signaling (operation 1301). The terminal may transmit at least one of the following pieces of information to the base station as the capability information for joint channel estimation.

- Whether to support joint channel estimation (or DM-RS bundling)
- A maximum duration for which transmission consistency and phase continuity for joint channel estimation is maintainable
- Whether to be able to restart joint channel estimation after even occurrence (e.g., a processing time "T" for restarting joint channel estimation)

Thereafter, the terminal may receive configuration information for a configured-TDW for joint channel estimation from the base station through higher layer signaling or L1 signaling. The terminal may determine a configured-TDW, based on the configured configuration information for the configured-TDW, and a paired spectrum (FDD configuration, consecutive physical slot), or an unpaired spectrum (TDD configuration, non-consecutive physical slot) (operation 1302).

More specifically, for the terminal, a configured-TDW may be enabled and the window size "L" of the configured TDW may be configured through higher layer signaling or L1 signaling. Thereafter, in a case of a paired spectrum, the terminal may continuously configure a configured-TDW having a length of "L", starting from a first PUSCH transmission slot or an available slot for joint channel estimation until the last PUSCH transmission is completed. On the contrary, in a case of an unpaired spectrum, the terminal may configure a first configured-TDW having a length of "L" from a first PUSCH or available slot for joint channel estimation, and may perform implicit determination based on subsequent available slots. The terminal may determine a configured-TDW before the first PUSCH transmission, based on a semi-static DL/UL configuration. Alternatively, the terminal may determine a configured-TDW before the first PUSCH transmission by considering RRC configuration(s), TDRA in DCI scheduling a PUSCH, a CG configuration, or activation DCI, which are used to determine an available slot. Also in a case of an unpaired spectrum, a configured-TDW may be continuously configured for consecutive physical slots in the same way as a case of a paired spectrum. An additional configured-TDW configuration method may be described with reference to the following description regarding FIG. 14.

Thereafter, based on the configured configured-TDW, the terminal may determine an actual-TDW in the configured-TDW, for which actual joint channel estimation is performed. The actual-TDW may be determined considering an event and the capability of the terminal (operation 1303).

More specifically, when an event has occurred in the configured-TDW, the terminal may determine a PUSCH immediately before the event as the end of a previously configured actual-TDW. Thereafter, a new actual-TDW may be restarted in the configured-TDW with respect to a PUSCH transmission after the event. In a case of the actual-TDW being restarted after the event, the terminal may determine whether the actual-TDW is restarted, based on a UE capability. When the UE capability supports restart of the actual-TDW, the terminal may configure a new actual-TDW immediately after the event and perform joint channel estimation. Otherwise, the terminal determines that joint channel estimation is not performed for PUSCH transmission after the event in the configured-TDW, and may transmit a PUSCH while not maintaining power consistency and phase continuity. An additional actual-TDW configuration method may be described with reference to the following description regarding FIG. 15.

The terminal may perform PUSCH transmission, based on the configured configured-TDW and actual-TDW (operation 1304).

With reference to FIG. 13B, an operation of a base station that determines and configures a configured-TDW and an actual-TDW for joint channel estimation will be described.

A base station may receive capability information of a terminal for joint channel estimation from the terminal through higher layer signaling or L1 signaling (operation 1305). The base station may receive at least one of the following pieces of information from the terminal as the capability information of the terminal for joint channel estimation.

- Whether to support joint channel estimation (or DM-RS bundling)
- A maximum duration for which the terminal is able to maintain transmission consistency and phase continuity for joint channel estimation
- Whether the terminal is able to restart joint channel estimation after even occurrence (e.g., a processing time "T" for restarting joint channel estimation)

Thereafter, the base station may transmit configuration information for a configured-TDW for joint channel estimation to the terminal through higher layer signaling or L1 signaling. The base station may refer to the UE capability information to determine the configuration information for the configured-TDW (operation 1306).

For example, when the base station receives, from the terminal, maximum duration information on a maximum duration for which power consistency and phase continuity are maintainable, the base station may configure the length of the configured-TDW to be smaller than the configured maximum duration. Meanwhile, when the base station does not receive maximum duration information from the terminal, the base station may randomly configure the length of the configured-TDW, and when joint channel estimation is performed in an interval longer than the maximum duration, the terminal and the base station may consider an event in which power consistency and phase discontinuity are broken. Thereafter, the base station may determine a configured-TDW, based on the configuration information for the configured-TDW including the configured length information, and a paired spectrum (FDD configuration, consecutive physical slot), or an unpaired spectrum (TDD configuration, non-consecutive physical slot).

More specifically, the base station may enable a configured-TDW and configure the window size "L" of the configured-TDW, which is determined considering the UE capability, through higher layer signaling or L1 signaling. Thereafter, in a case of a paired spectrum, the base station may continuously configure a configured-TDW having a length of "L", starting from a first PUSCH transmission slot or an available slot for joint channel estimation until the last PUSCH transmission is completed. On the contrary, in a case of an unpaired spectrum, the base station may configure a first configured-TDW having a length of "L" from a first PUSCH or available slot for joint channel estimation, and may perform implicit determination based on subsequent available slots. The base station may determine a configured-TDW before the first PUSCH transmission, based on a semi-static DL/UL configuration. Alternatively, the base station may determine a configured-TDW before the first PUSCH transmission by considering RRC configuration(s), TDRA in DCI scheduling a PUSCH, a CG configuration, or activation DCI, which are used to determine an available slot. Also in a case of an unpaired spectrum, a configured-TDW may be continuously configured for consecutive physical slots in the same way as a case of a paired spectrum. An additional configured-TDW configuration method may be described with reference to the following description regarding FIG. 14. Thereafter, based on the configured configured-TDW, the base station may determine an actual-TDW in the configured-TDW, for which actual joint channel estimation is performed. The actual-TDW may be determined considering an event and the capability of the terminal (operation 1307).

More specifically, when an event has occurred in the configured-TDW or when the event is configured for the terminal, the base station may determine a PUSCH immediately before the event as the end of a previously configured actual-TDW. Thereafter, a new actual-TDW may be restarted in the configured-TDW with respect to a PUSCH transmission after the event. In a case of the actual-TDW being restarted after the event, the base station may determine whether the actual-TDW is restarted, based on a UE capability received from the terminal. When the UE capability supports restart of the actual-TDW, the base station may configure a new actual-TDW immediately after the event and perform joint channel estimation. Otherwise, the base station determines that joint channel estimation is not performed for PUSCH transmission after the event in the configured-TDW, and may not apply joint channel estimation to each PUSCH transmission. An additional actual-TDW configuration method may be described with reference to the following description regarding FIG. 15.

The base station may receive PUSCH transmission, based on the configured configured-TDW and actual-TDW, and perform joint channel estimation for the actual-TDW (operation 1308).

Through the above operations of the terminal and the base station, a configured-TDW and an actual-TDW may be configured, based on an event. Accordingly, the terminal and the base station may determine the same time domain window for performing joint channel estimation so as to more efficiently perform joint channel estimation.

Figure 14:
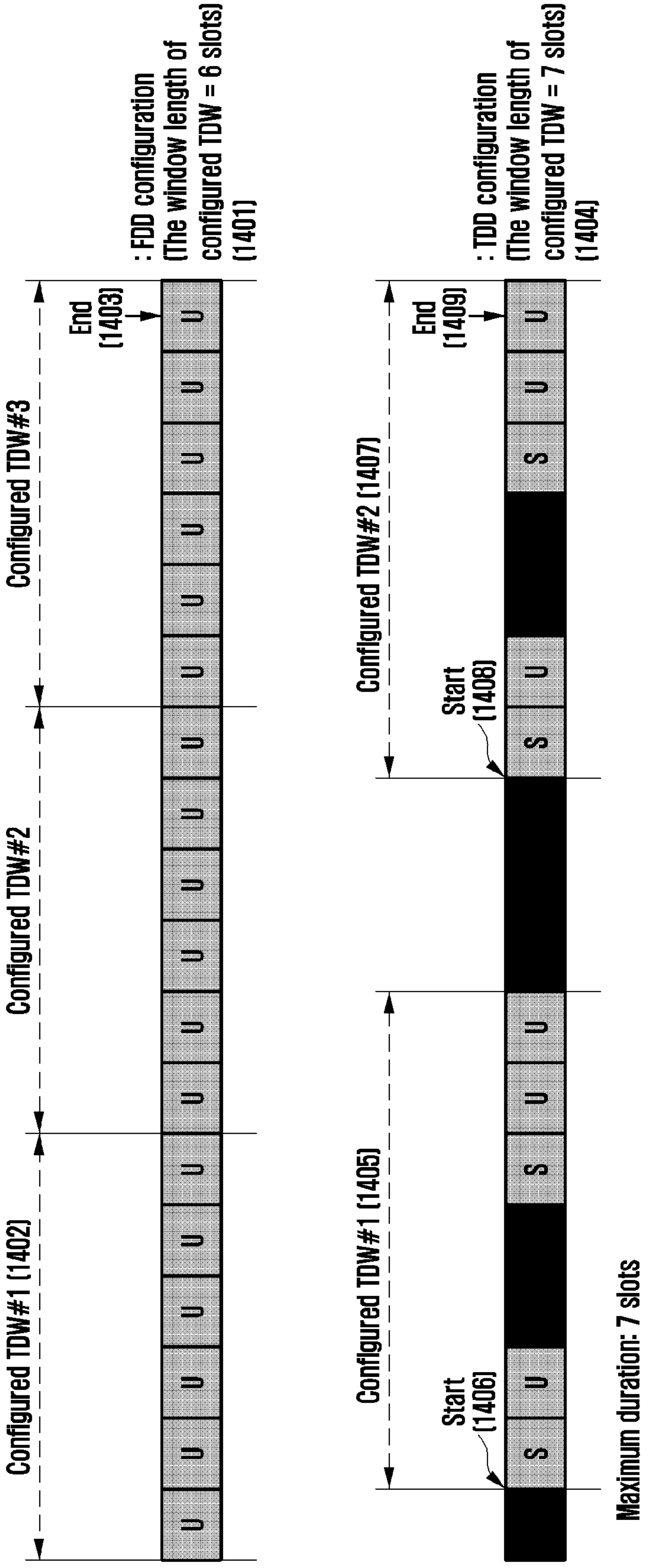
FIG. 14 is a diagram illustrating a configured-TDW configuration method for joint channel estimation in a 5G system.

FIG. 14 is a diagram illustrating a configured-TDW configuration method for joint channel estimation in a 5G system.

Referring to FIG. 14, when the length "L" of a configured-TDW for joint channel estimation is configured as 6 slots by a base station for a terminal through higher layer signaling and L1 signaling, and joint channel estimation is enabled in PUSCH transmission of a paired spectrum (FDD configuration) (as indicated by reference numeral 1401), the terminal may determine configured-TDW #1 1402 starting from a first PUSCH transmission slot or an available slot, and then continuously determine configured-TDW #2 and configured-TDW #3. The end of the configured-TDWs may be the last PUSCH slot 1403 in which PUSCH repetition is ended. In another case, when the length "L" of a configured-TDW for joint channel estimation is configured as 7 slots by a base station for a terminal through higher layer signaling and L1 signaling, and joint channel estimation is enabled in PUSCH transmission of an unpaired spectrum (e.g., TDD configuration: DDDSUDDSUU) (as indicated by reference numeral 1404), the terminal may determine configured-TDW #1 1405, based on only a semi-static DL/UL configuration before the first PUSCH transmission, or may determine configured-TDW #1 1405 by considering RRC configuration(s), TDRA in DCI scheduling a PUSCH, a CG configuration, or activation DCI, which are used to determine an available slot. The terminal may determine a starting point 1406 of configured-TDW #1, subsequent configured-TDW #2 1407, and a starting point 1408 of configured-TDW #2 1407 through the information. Thereafter, the terminal may determine the last PUSCH slot in which scheduled PUSCH repetition is ended, as an end 1409 of the configured-TDWs.

Figure 15:
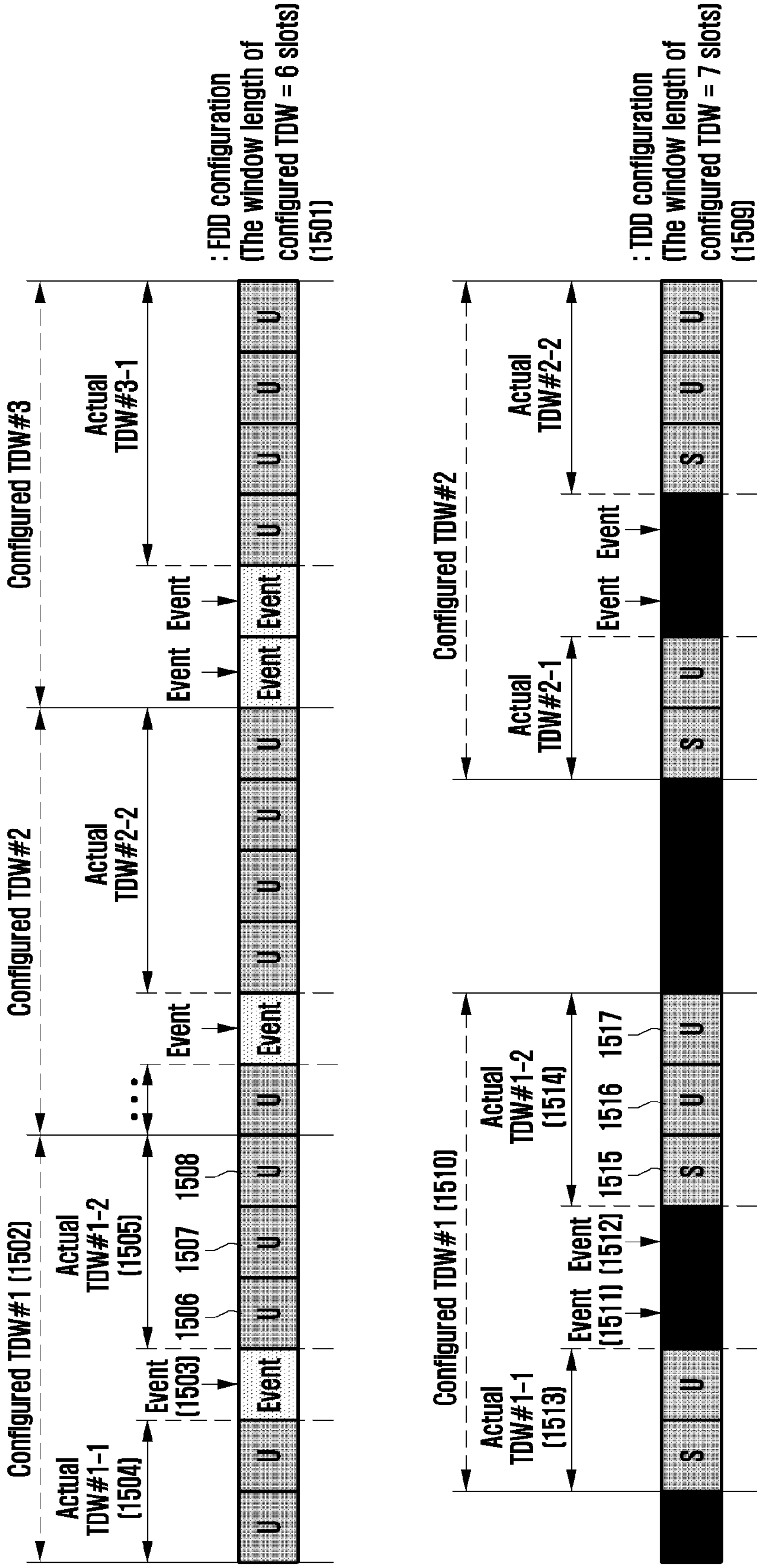
FIG. 15 is a diagram illustrating an actual-TDW configuration method for joint channel estimation in a 5G system.

FIG. 15 is a diagram illustrating an actual-TDW configuration method for joint channel estimation in a 5G system.

Referring to FIG. 15, when the length "L" of a configured-TDW for joint channel estimation is configured as 6 slots by a base station for a terminal through higher layer signaling and L1 signaling, and joint channel estimation is enabled in PUSCH transmission of a paired spectrum (FDD configuration) (as indicated by reference numeral 1501), the terminal may determine configured-TDW #1 1502 starting from a first PUSCH transmission slot or an available slot, and then continuously determine configured-TDW #2 and configured-TDW #3. The end of the configured-TDWs may be the last PUSCH slot in which PUSCH repetition is ended. Thereafter, the terminal may determine an actual-TDW, based on the determined configured-TDW. When an event 1503 has occurred in configured-TDW #1 1502, the terminal may determine actual-TDW #1-1 1504, based on the event 1503. The end of the actual-TDW #1-1 1504 may be a PUSCH transmission slot immediately before the event 1503. Thereafter, based on the event 1503, the terminal may determine whether to configure actual-TDW #1-2 1505 for the next PUSCH transmission. If the capability of the terminal supports restart of a new actual-TDW after the event 1503, the terminal may configure a new actual-TDW #1-2 for three U slots 1506-1508, and apply joint channel estimation thereto. On the contrary, if the capability of the terminal does not support joint channel estimation after the event 1503, the terminal may perform channel estimation and decoding for each of the U slots 1506-1508. Thereafter, the terminal may determine an actual-TDW by identically applying the method to subsequent configured-TDWs.

In another case, when the length "L" of a configured-TDW for joint channel estimation is configured as 7 slots by a base station for a terminal through higher layer signaling and L1 signaling, and joint channel estimation is enabled in PUSCH transmission of an unpaired spectrum (e.g., TDD configuration: DDDSUDDSUU) (as indicated by reference numeral 1509), the terminal may determine configured-TDW #1 1510, based on only a semi-static DL/UL configuration before the first PUSCH transmission, or may determine configured-TDW #1 1510 by considering RRC configuration(s), TDRA in DCI scheduling a PUSCH, a CG configuration, or activation DCI, which are used to determine an available slot. The terminal may determine configured-TDW #1 1510 and subsequent configured-TDW #2 through the information. Thereafter, the terminal may determine the last PUSCH slot in which scheduled PUSCH repetition is ended, as the end of the configured-TDWs. Thereafter, the terminal may determine an actual-TDW, based on the determined configured-TDW. When events 1511 and 1512 have occurred in configured-TDW #1 1510, the terminal may determine a PUSCH positioned immediately before the event 1511 as the end of actual-TDW #1-1 1513, based on the event 1511. Thereafter, based on the event 1512, the terminal may determine whether to configure actual-TDW #1-2 1514 for a next PUSCH transmission after the event 1512. If the capability of the terminal supports restart of a new actual-TDW after the event 1512, the terminal may configure a new actual-TDW #1-2 1514 for an S slot 1515, a U slot 1516, and a U slot 1517, and apply joint channel estimation thereto. On the contrary, if the capability of the terminal does not support joint channel estimation after the event 1512, the terminal may perform channel estimation and decoding for each of the S slot 1515, the U slot 1516, and the U slot 1517. Thereafter, the terminal may determine an actual-TDW by identically applying the method to subsequent configured-TDWs.

In the above method, the capability of the terminal for determining restart of an actual-TDW after an event may include a processing time "T" for restarting joint channel estimation. For example, if the capability of the terminal supports restarting at a time point after passage of a "T" time from event occurrence, a new actual-TDW may be configured based on a PUSCH configured to be after the time point after passage of the "T" time from the event occurrence. For PUSCH transmissions in the configured "T" period after the event, channel estimation and decoding may be performed for each of them. In addition, when the events 1511 and 1522 are continuous as illustrated in FIG. 15, the processing time "T" may be applied based on the start or the end of the events.

Through the above method, a terminal may configure/apply a configured-TDW and an actual-TDW for PUSCH repetition based on a paired spectrum/unpaired spectrum In addition, the event may be considered as one or a combination of DL transmission based on a dynamic SFI, PUSCH drop caused by a cancellation indication (CI), a case where an actual-TDW exceeds a maximum duration, frequency hopping, precoder cycling, overlap with PUSCH transmission with a high priority, a case where DL reception and a DL monitoring occasion are configured, and a case where PUSCH transmission power is distributed by CA/DC. In addition, the last PUSCH repetition may be determined as a PUSCH satisfying a configured count according to a Rel-17 PUSCH repetition procedure.

Figure 16:
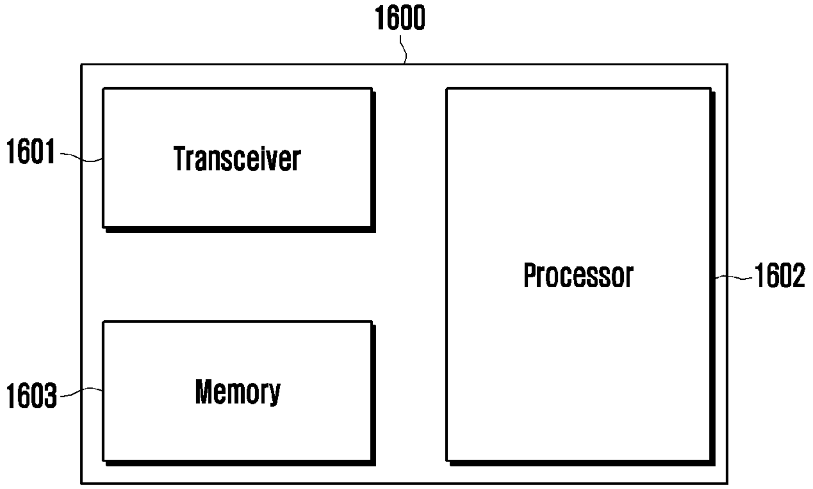
FIG. 16 is a block diagram of a terminal according to an embodiment of the disclosure.

FIG. 16 is a block diagram of a terminal according to an embodiment of the disclosure.

Referring to FIG. 16, a terminal 1600 may include a transceiver 1601, a controller (processor) 1602, and a storage unit (memory) 1603. According to a method of efficiently transmitting or receiving a channel and a signal in a 5G communication system corresponding to the above embodiments, the transceiver 1601, the controller 1602, and the storage unit 1603 of the terminal 1600 may be operated. However, the elements of the terminal 1600 according to an embodiment are not limited to the above example. According to another embodiment, the terminal 1600 may also include more or fewer elements than the above elements. In addition, in a particular case, the transceiver 1601, the controller 1602, and the storage unit 1603 may be implemented in a single chip type.

The transceiver 1601 may also be configured by a transmitter and a receiver according to another embodiment. The transceiver 1601 may transmit or receive a signal to or from a base station. The signal may include control information and data. To this end, the transceiver 1601 may include an RF transmitter that up-converts and amplifies a frequency of a transmitted signal, an RF receiver that low-noise amplifies a received signal and down-converts the frequency, and the like. In addition, the transceiver 1601 may receive a signal through a wireless channel and output the signal to the controller 1602, and may transmit a signal output from the controller 1602, through a wireless channel.

The controller 1602 may control a series of processes allowing the terminal 1600 to be operated according to an embodiment of the disclosure described above. For example, the controller 1602 may perform a method of changing the OFDM symbol position of a DMRS by considering a method of estimating a channel by simultaneously using DMRSs transmitted in multiple PUSCHs according to an embodiment of the disclosure. To this end, the controller 1602 may include at least one processor. For example, the controller 1602 may include a communication processor (CP) performing a control for communication, and an application processor (AP) controlling a higher layer, such as an application program.

The storage unit 1603 may store control information or data such as information related to channel estimation using DMRSs transmitted in a PUSCH, which is included in a signal obtained in the terminal 1600, and may have a region for storing data required for control of the controller 1602, and data generated by control by the controller 1602.

Figure 17:
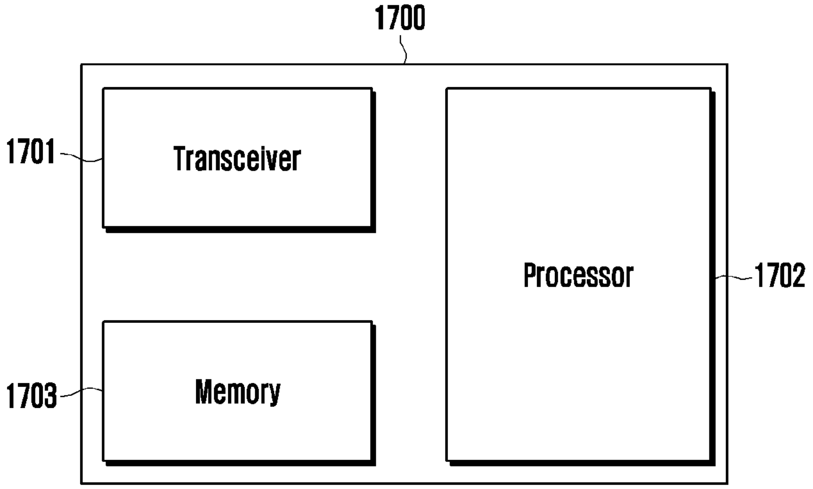
FIG. 17 is a block diagram of a base station according to an embodiment of the disclosure.

FIG. 17 is a block diagram of a base station according to an embodiment.

Referring to FIG. 17, a base station 1700 may include a transceiver 1701, a controller (processor) 1702, and a storage unit (memory) 1703. According to a method of efficiently transmitting or receiving a channel and a signal in a 5G communication system corresponding to the above embodiments, the transceiver 1701, the controller 1702, and the storage unit 1703 of the base station 1700 may be operated. However, the elements of the base station 1700 according to an embodiment are not limited to the above example. According to another embodiment, base station 1700 may also include more or fewer elements than the above elements. In addition, in a particular case, the transceiver 1701, the controller 1702, and the storage unit 1703 may be implemented in a single chip type.

The transceiver 1701 may also be configured by a transmitter and a receiver according to another embodiment. The transceiver 1701 may transmit or receive a signal to or from a terminal. The signal may include control information and data. To this end, the transceiver 1701 may include an RF transmitter that up-converts and amplifies a frequency of a transmitted signal, an RF receiver that low-noise amplifies a received signal and down-converts the frequency, and the like. In addition, the transceiver 1701 may receive a signal through a wireless channel and output the signal to the controller 1702, and may transmit a signal output from the controller 1702, through a wireless channel.

The controller 1702 may control a series of processes so as to enable the base station 1700 to operate according to an embodiment of the disclosure described above. For example, the controller 1702 may perform a method of changing the OFDM symbol position of a DMRS by considering a method of estimating a channel by using DMRSs transmitted in a PUSCH according to an embodiment of the disclosure. To this end, the controller 1702 may include at least one processor. For example, the controller 1702 may include a communication processor (CP) performing a control for communication, and an application processor (AP) controlling a higher layer, such as an application program.

The storage unit 1703 may store control information and data, such as information related to channel estimation, or control information and data received from the terminal by using DMRSs transmitted in a PUSCH determined in the base station 1700, and may have a region for storing data required for control of the controller 1702, and data generated by control by the controller 1702.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary, so long as not technically contradictory to each other.

The invention claimed is:

1. A method performed by a terminal in a wireless communication system, the method comprising:

receiving, from a base station, higher-layer configuration information including first information for configuring a time domain window (TDW) resource determination mode for physical uplink shared channel (PUSCH) repetitions and second information for configuring a TDW length, wherein the TDW resource determination mode is one of a first mode in which a start of a TDW is based on a start of a resource determined for PUSCH transmission after a resource determined for PUSCH transmission of a previous TDW and a second mode in which TDWs are continuously determined over consecutive slots;

determining, based on the first information, that the TDW resource determination mode is configured as the first mode;

determining at least one TDW based on the TDW length and the first mode; and transmitting, to the base station, repeated PUSCHs, maintaining power consistency and phase continuity based on the determined at least one TDW.

2. The method of claim 1, further comprising transmitting, to the base station, capability information on a maximum duration, wherein the capability information indicates whether the terminal supports the maximum duration during which the terminal is able to maintain the power consistency and the phase continuity, and wherein the TDW length does not exceed the maximum duration.

3. A method performed by a base station in a wireless communication system, the method comprising:

determining a time domain window (TDW) resource determination mode for physical uplink shared channel (PUSCH) repetitions and a TDW length, wherein the TDW resource determination mode is one of a first mode in which a start of a TDW is based on a start of a resource determined for PUSCH transmission after a resource determined for PUSCH transmission of a previous TDW and a second mode in which TDWs are continuously determined over consecutive slots;

transmitting, to a terminal, higher-layer configuration information generated based on the determination, the higher-layer configuration information including first information for configuring the TDW resource determination mode as the first mode and second information for configuring the TDW length; and receiving, from the terminal, repeated PUSCHs transmitted maintaining power consistency and phase continuity in at least one TDW according to the TDW length and the first mode.

4. The method of claim 3, further comprising receiving, from the terminal, capability information on a maximum duration, wherein the capability information indicates whether the terminal supports the maximum duration during which the terminal is able to maintain the power consistency and the phase continuity, and wherein the TDW length does not exceed the maximum duration.

5. A terminal in a wireless communication system, the terminal comprising:

a transceiver; and a controller configured to:

receive, from a base station via the transceiver, higher-layer configuration information including first information for configuring a time domain window (TDW) resource determination mode for physical uplink shared channel (PUSCH) repetitions and second information for configuring a TDW length, wherein the TDW resource determination mode is one of a first mode in which a start of a TDW is based on a start of a resource determined for PUSCH transmission after a resource determined for PUSCH transmission of a previous TDW and a second mode in which TDWs are continuously determined over consecutive slots determine, based on the first information, that the TDW resource determination mode is configured as the first mode, determine at least one TDW based on the TDW length and the first mode, and transmit, to the base station via the transceiver, repeated PUSCHs, maintaining power consistency and phase continuity based on the determined at least one TDW.

6. The terminal of claim 5, wherein the controller is configured transmit, to the base station via the transceiver, capability information on a maximum duration, wherein the capability information indicates whether the terminal supports the maximum duration during which the terminal is able to maintain the power consistency and the phase continuity, and wherein the TDW length does not exceed the maximum duration.

7. A base station in a wireless communication system, the base station comprising:

a transceiver; and a controller configured to:

determine a time domain window (TDW) resource determination mode for physical uplink shared channel (PUSCH) repetitions and a TDW length, wherein the TDW resource determination mode is one of a first mode in which a start of a TDW is based on a start of a resource determined for PUSCH transmission after a resource determined for PUSCH transmission of a previous TDW and a second mode in which TDWs are continuously determined over consecutive slots, transmit, to a terminal via the transceiver, higher-layer configuration information generated based on the determination, the higher-layer configuration information including first information for configuring the TDW resource determination mode as the first mode and second information for configuring the TDW length, and receive, from the terminal via the transceiver, repeated PUSCHs transmitted maintaining power consistency and phase continuity in at least one TDW according to the TDW length and the first mode.

8. The base station of claim 7, wherein the controller is further configured to receive, from the terminal via the transceiver, capability information on a maximum duration, wherein the capability information indicates whether the terminal supports the maximum duration during which the terminal is able to maintain the power consistency and the phase continuity, and wherein the TDW length does not exceed the maximum duration.

* * * * *